(12) United States Patent
Dregger et al.

(10) Patent No.: US 11,603,232 B2
(45) Date of Patent: Mar. 14, 2023

(54) PRESSURE-RESISTANT CONTAINER

(71) Applicant: ENVICAN GMBH, Zurich (CH)

(72) Inventors: Thomas Dregger, Zurich (CH);
Christoph Schönig, Zurich (CH)

(73) Assignee: ENVICAN GMBH, Zurich (CH)

( * ) Notice: Subject to any disclaimer, the term of this patent is extended or adjusted under 35 U.S.C. 154(b) by 167 days.

(21) Appl. No.: 16/614,919

(22) PCT Filed: Jun. 8, 2018

(86) PCT No.: PCT/EP2018/065183
§ 371 (c)(1),
(2) Date: Nov. 19, 2019

(87) PCT Pub. No.: WO2018/224658
PCT Pub. Date: Dec. 13, 2018

(65) Prior Publication Data
US 2020/0189791 A1   Jun. 18, 2020

(51) Int. Cl.
*B65D 8/00* (2006.01)
*B29C 53/56* (2006.01)
(Continued)

(52) U.S. Cl.
CPC ............ *B65D 15/06* (2013.01); *B29C 53/566* (2013.01); *B29C 53/8091* (2013.01); *B29C 57/04* (2013.01); *B29D 22/003* (2013.01); *B31C 3/02* (2013.01); *B31C 3/04* (2013.01); *B31C 11/02* (2013.01); *B32B 1/02* (2013.01);
(Continued)

(58) Field of Classification Search
None
See application file for complete search history.

(56) References Cited

U.S. PATENT DOCUMENTS

| 2,641,827 A | 6/1953 | Carpenter |
| 3,687,351 A | 8/1972 | Kaercher et al. |

(Continued)

FOREIGN PATENT DOCUMENTS

| DE | 202007010192 U1 | 12/2007 |
| EP | 0038488 A2 | 10/1981 |

(Continued)

OTHER PUBLICATIONS

International Search Report in International Application No. PCT/EP2018/065183, dated Dec. 18, 2018, 12 pages.

*Primary Examiner* — Timothy Kennedy
*Assistant Examiner* — Olukorede Esan
(74) *Attorney, Agent, or Firm* — Liang & Hennessey LLP; Brian Hennessey

(57) ABSTRACT

The invention relates to a can containing a liquid and/or a gaseous medium which has positive pressure or develops such during transport or storage, wherein the cylindrical can shell of the can consists mainly of paper or cardboard material and is closed at the bottom with a bottom element and at the top with a cover element, wherein the can withstands an internal pressure of at least 5 bar, wherein the innermost layer of the can shell consists of a straight-wound barrier layer having a longitudinally extending folded seam, wherein the barrier layer is a prefabricated laminate made of an inner diffusion-tight barrier film or an inner diffusion-tight barrier laminate and an outer kraft paper layer.

15 Claims, 11 Drawing Sheets

(51) Int. Cl.
  *B29C 53/80* (2006.01)
  *B29C 57/04* (2006.01)
  *B29D 22/00* (2006.01)
  *B31C 3/02* (2006.01)
  *B31C 3/04* (2006.01)
  *B31C 11/02* (2006.01)
  *B32B 1/02* (2006.01)
  *B32B 7/12* (2006.01)
  *B32B 29/00* (2006.01)
  *B65D 65/40* (2006.01)
  *B67B 1/10* (2006.01)
  *B67C 3/22* (2006.01)
  *B29K 711/12* (2006.01)
  *B29L 31/00* (2006.01)

(52) U.S. Cl.
  CPC .............. *B32B 7/12* (2013.01); *B32B 29/005* (2013.01); *B65D 65/40* (2013.01); *B67B 1/10* (2013.01); *B67C 3/225* (2013.01); *B29C 2793/0027* (2013.01); *B29K 2711/123* (2013.01); *B29L 2031/717* (2013.01); *B32B 2255/12* (2013.01); *B32B 2255/26* (2013.01); *B32B 2307/54* (2013.01); *B32B 2439/66* (2013.01)

(56) References Cited

U.S. PATENT DOCUMENTS

| | | | |
|---|---|---|---|
| 4,181,239 | A | 1/1980 | Deputdt et al. |
| 4,642,252 | A | 2/1987 | Sasaki et al. |
| 4,766,019 | A | 8/1988 | Michaels et al. |
| 2004/0052987 | A1* | 3/2004 | Shetty ................. B32B 27/34 156/203 |
| 2009/0123677 | A1 | 5/2009 | Sins |

FOREIGN PATENT DOCUMENTS

| | | |
|---|---|---|
| EP | 0101139 A2 | 2/1984 |
| EP | 0163492 A | 12/1985 |
| EP | 0166667 A1 | 1/1986 |
| FR | 2618726 A1 | 2/1989 |
| GB | 683206 A | 11/1952 |
| GB | 2449747 A | 12/2008 |
| JP | S5937139 A | 2/1984 |
| WO | 9959882 A | 11/1999 |
| WO | 2007135234 A1 | 11/2007 |
| WO | 2012155890 A1 | 11/2012 |
| WO | 2013016153 A1 | 1/2013 |

\* cited by examiner

PRESSURE-RESISTANT CONTAINER

CROSS-REFERENCE TO RELATED APPLICATIONS

The present application is a national phase application of PCT Application No. PCT/EP2018/224658, filed Jun. 8, 2018, entitled "PRESSURE-RESISTANT CONTAINER", which claims the benefit of PCT Application No. PCT/EP2017/064158, filed Jun. 9, 2017, each of which is incorporated by reference in its entirety.

BACKGROUND OF THE INVENTION

1. Field of the Invention

The invention relates to a pressure-resistant can with a can shell made of composite material.

2. Description of the Related Art

A pressure-resistant can is a can for the packaging of media having positive pressure or media that can develop such during storage, transport or use.

According to current practice, aluminium cans are centrally produced in a suitable location and delivered empty to various can fillers. It is essential to transport enormous quantities of empties, and thus air, around the landscape, which makes little sense. Because can fillers must always have enough empties in stock to safely avoid bottlenecks when filling, they are forced to maintain large warehouses with adequate space and a corresponding capital commitment. The cans are then filled in place and closed by the filler operation with a cover.

In the packaging industry, multi-ply packaging is known having a paper or cardboard packaging wrapper, individual plies of which are wound either straight or obliquely about the longitudinal direction of a mandrel and thus either have joint areas with themselves, extending longitudinally of the packaging shell, or joint areas with themselves, spirally extending around the longitudinal direction of the packaging shell. These packages may have an inner barrier layer, which has a tight folded seam in the joint area of its two edges. Cardboard and paper materials are generally used as the composite material of the layers. Such can shells have hitherto been used for general packaging purposes, for example for packaging powders, such as detergents, cocoa powder, or for snacks, such as crisps, wherein in the case of foodstuffs, the barrier layer protects the foodstuff from the ingress of liquids and gases from the outside, and prevents the escape of liquids and gases from the food or from the interior of the packaging shell.

Meanwhile, there are many composite packages with a can shell made of composite material for food and drinks. However, they reach their limits in the field of compressive strength so that they have not been used for pressurised media, in particular carbonated beverages. Although there are proposals in the patent literature for such can shells made of composite material for carbonated drinks, for example in WO 9959882 A9 and EP 0101139 A2, so far there have been no such products on the market. Perhaps because in the proposed can shells and/or finished cans, the compressive strength could not be achieved sufficiently, or because these proposed can shells and/or finished cans were not competitive with the conventional beverage cans, in particular aluminium cans.

A disadvantage of the packages for carbonated drinks described in WO 9959882 A9 are their special shapes, which on the one hand require their own filling and sealing equipment and on the other hand deviate from the form of a beverage can consumers are familiar with.

A disadvantage of the packages for carbonated drinks described in EP 0101139 A2 are their special shapes, which on the one hand require their own filling and sealing equipment and on the other hand deviate from the form of a beverage can consumers are familiar with, in particular in the region of the bottom and the cover.

From DE202007010192U1 a composite can for carbonated drinks is known, the shell of which mainly consists of paper or cardboard material, wherein the wall thickness is given as 0.5545 mm A disadvantage of DE202007010192U1 is that the shell consists of a thick sulphate board coated on both sides which overlaps itself, which results in a section which is very widespread in comparison to the rest of the shell. Another disadvantage is that the lateral edge of the inner and outer edge of the laminate is exposed and thus must be additionally sealed, for example by a tape.

In WO2012155890A1 a carbonated beverage package is described having a shell made of composite material, wherein the shell primarily consists of paper or cardboard material. The shell thickness (or layer thickness) of the composite shell of the can is between 0.5 and 0.8 mm, wherein the thickness of the barrier film is from 50 to 120 µm. A disadvantage of WO2012155890A1 is that the entire laminate overlaps itself, resulting in a section that is very widespread in comparison to the rest of the shell. Another disadvantage is that the lateral edge of the inner and outer edge of the laminate is exposed and thus must be additionally sealed, for example by a tape.

From U.S. Pat. No. 3,687,351 A1 a composite can for carbonated drinks is known, the shell of which mainly consists of paper or cardboard material, wherein the shell thickness is about 0.48 mm, which is disadvantageous in that the layer structure comprises a thick aluminium layer having approximately 25 µm layer thickness.

U.S. Pat. No. 4,642,252 describes carbonated beverage packaging with composite shells, wherein the shell may be made largely of paper or cardboard material. The shell thickness of the exemplary embodiment according to FIGS. 1, 8 and 9 is in each case about 900 µm, i.e. 0.9 mm. A disadvantage of U.S. Pat. No. 4,642,252 is that the innermost layer, namely the barrier layer, is wound spirally, which increases the length of its folded seam.

In U.S. Pat. No. 4,766,019 a can for carbonated drinks is proposed which has a shell made of several layers of plastic layers. The shell thickness (or layer thickness) of the shell is given in one exemplary embodiment with 22 mils, i.e. approx. 0.56 mm. It is stated in U.S. Pat. No. 4,766,019 that the shell thickness should be less than 30 mils (0.762 mm) so that the plastic shell can be closed with conventional aluminium covers. The disadvantage is that the shell is made entirely of plastic, which seems less sustainable. The innermost barrier layer in U.S. Pat. No. 4,766,019 is extruded on a mandrel.

U.S. Pat. No. 4,181,239A also shows a can with a plastic shell, wherein it is disadvantageous in that the can shell is constructed entirely of plastic layers. In U.S. Pat. No. 4,181,239A, it is stated that the shell thickness should be between 85 and 770 µm, preferably between 100 and 400 µm.

From the prior art, it is apparent that it has been recognised that the can shell must not exceed a certain thickness so that it can still be closed with standard aluminium can covers of conventional aluminium cans. Secondly, it has apparently been recognised, at least in the can shells of several wound individual layers, that the can shell should not show any large deviations in its layer thickness over the circumference. To achieve this, the innermost layer is designed as a thin plastic film or from a laminate of different plastic films and possibly an aluminium foil, which can be taken from U.S. Pat. No. 4,181,239A, 4,766,019 and 4,642,252. In U.S. Pat. No. 4,642,252 it is also provided that the spiral-shaped folded seam of the barrier laminate of plastic films and an aluminium foil is laminated by an intermediate layer of paper.

It has been found to be disadvantageous that, in the case of paper or cardboard composite cans made of wound individual layers, the hold between the barrier laminate of plastic films and optionally an aluminium foil and the subsequent layer of paper or cardboard material for use as packaging for pressurised media, in particular carbonated beverages, is insufficient, which can lead to damage, in particular in the region of the folded seam, which leads to a leak, which in turn leads to the tearing or bursting of the can shell by the wetness of the paper or cardboard material.

SUMMARY OF THE INVENTION

The invention thus relates to a fluid container, in particular a beverage container, which may also be used for gas emitting canned drinks, such as carbonated mineral waters, sweet drinks, energy drinks or beers, because it is sufficiently resistant to pressure for these purposes as a special feature. Depending on the design, it is suitable for spray cans of all kinds with even higher internal pressures. Moreover, the invention relates to a technical manufacturing and logistics method, which, with the use of such a beverage can, facilitates the beverage filling and in particular the can filling of the containers on site and can produce same as needed, preferably synchronously with an existing filling plant. This saves a lot of space and storage costs and is independent of the delivery of empties. Preferably, conventional can fillers for the introduction of this new fluid container or beverage container will not have to modify their can filling plants, but can continue to use them seamlessly. Their own production of cans is facilitated, and the space required for this is a small fraction of the space required for the previously indispensable buffer storage of empty aluminium cans for their subsequent filling.

The object of the invention is to provide a marketable can shell made of composite material for a can for pressurised media, in particular carbonated beverages, which can reliably withstand the prevailing or possible internal pressure of such media and mainly consists of paper or cardboard material. Furthermore, the fluid container should be producible in a timely manner and with little space required with low technical and energy costs locally at a can filling operation, wherein its production may optionally be coupled with a filling plant in real time.

To achieve the object, a can is proposed, containing a liquid and/or a gaseous medium, which may have positive pressure or develop such during transport or storage, wherein the cylindrical can shell of the can mainly consists of paper or cardboard material and comprises at least two wound layers and is closed at the bottom with a bottom element, and with a cover at the top, wherein the can withstands an internal pressure of at least 5 bar, wherein the innermost layer of the can shell consists of a straight wound barrier layer, which comprises a folded seam that runs in the longitudinal direction of the can, wherein the barrier layer is a laminate of an inner diffusion-tight film or an inner diffusion-tight barrier laminate and an outer kraft paper layer, wherein at least one further wound layer of paper or cardboard material is present around the barrier layer of the can shell, wherein the cardboard or paper surfaces of the barrier layer and the wound layer made of paper or cardboard material lying on top of one another are adhered, in particular glued, directly to one another.

Due to the fact that the innermost layer is wound straight and thus has a straight folded seam with itself and contains a stable layer of kraft paper, it is advantageously achieved that this innermost layer, and in particular the folded seam, has the necessary stability to endure high internal pressures of the can.

Due to the fact that the barrier layer is formed as a laminate of film and kraft paper, the film is relieved in the region of the folded seam because the tensile forces are derived from kraft paper, wherein the tensile forces act advantageously in the circumferential direction by the straight folded seam and no additional forces are introduced in the longitudinal direction of the can, as would be the case with spiral winding of the innermost layer or the barrier layer.

Due to the fact that the innermost layer consists of paper material on the outside and the next layer is made of paper material, these two paper materials can be adhered, in particular glued, to each other directly so that the adhesive can penetrate both sides of the fibres of the paper material and thus the fibres of one paper layer are bonded by the adhesive directly to the fibres of the other paper layer. An advantage of this is the particularly firm hold, which is not achievable in this way if a barrier layer of plastic is present between the paper materials. The feature combination according to the invention thus achieves that the paper material of the kraft paper layers are glued together directly without intermediate layers, such as plastic films, so that the adhesive can penetrate into the fibre matrix of the paper material, whereby a particularly good hold of kraft paper layers to each other and the kraft paper layer of the barrier layer is achieved. It is believed that intervening plastic layers lead to a weakening of the layer structure due to their elasticity and/or due to their flow behaviour.

By means of the invention, it is achieved that the can shells can be produced on standard winding systems, wherein the robust barrier layer is processed as a laminate of barrier film and kraft paper at high speed on a winding mandrel, since this is significantly more tear resistant compared to pure films or laminates conventionally used.

The present invention takes a different route than that known in the prior art, in which the inner barrier layer is made as thin as possible and thus their overlap and thus the maximum deviation of the shell thickness is kept low. In the present invention, a thicker inner barrier layer is deliberately selected, where its disadvantage of the greater thickness difference in the overlapping region of the folded seam is more than offset by its advantages in terms of stability of the folded seam and the entire layer structure so that a marketable can with a can shell results for the first time, which is primarily formed of cardboard or paper material.

The barrier layer preferably has a layer thickness from 0.060 mm to 0.145 mm. The kraft paper layer of the barrier layer preferably has a layer thickness from 0.065 mm to 0.090 mm. The kraft paper layer of the barrier layer preferably has a tensile strength MD of at least 4.0 kN/m and a tensile strength CD of at least 2 kN/m. Preferably, the diffusion-tight barrier film or the diffusion-tight barrier laminate has a layer thickness from 0.033 mm to 0.055 mm.

Preferably, the barrier laminate comprises an aluminium layer and at least two plastic layers, wherein the aluminium layer is present between two plastic layers.

Preferably, the thickness of the shell over the circumference of the can is constant, or at least has a deviation, comprising at least one elevation, wherein the thickness of the shell on the position of the largest elevation is a maximum of 160% of the thickness of the rest of the constant-thickness shell and the largest elevation in absolute terms is a maximum of 290 µm.

Preferably, at least two additional kraft paper layers wound separately from one another are mounted above the barrier layer.

Preferably, the at least two kraft paper layers do not overlap themselves, or have at least one edge region with reduced thickness in the overlapping region with itself.

By means of this feature according to the invention, it is achieved that the at least two further kraft paper layers in their respective joint or overlapping region cause no or only an admissible increase in the layer thickness with themselves.

Preferably, the respective layer thickness of at least two of the further kraft paper layers is selected in each case from the range of 140 µm to 175 µm. The respective tensile strength of the kraft papers of the kraft paper layers is preferably at least 10 kN/m (MD) and at least 5 kN/m (CD).

Preferably, the further kraft paper layers and/or further layers of paper or cardboard material are each longitudinally wound. Preferably, their joint or overlap areas are located at different peripheral regions, or the mutually facing joint edges of two kraft paper layers are preferably offset from one another.

Preferably, the joint or overlap region of the kraft paper layer adjoining the barrier layer is offset relative to the folded seam of the barrier layer.

Less preferably, due to the more complex production, the kraft paper layer adjoining the barrier layer may be designed such that it joins the folded seam of the barrier layer on both sides so that the widened region of the folded seam is received in the gap between the joints of this kraft paper layer.

Preferably, the can has an outer sealing layer applied externally to the kraft paper layers, which may be present, for example, as a film, laminate, or coated paper. Preferably, the barrier layer, preferably at least two further kraft paper layers and preferably also the outer sealing layer on a winding system, are produced continuously to form a hollow tube, from which individual hollow cylinders are cut off.

Alternatively, the outermost of the at least two kraft paper layers may already be present as a laminate of a kraft paper layer and a barrier film before being wound, wherein the barrier film lies on the outside of the composite can shell after the winding has taken place.

The outer barrier film or the outer sealing layer on the outside of the composite can shell may be a semi-permeable film which allows moisture to escape from the can shell but does not allow moisture to enter the can shell from the outside.

The material of the outer barrier film or outer sealing layer on the outside of the composite can shell may be recyclable or renewable PE, biodegradable PE, EVOH or other known barrier materials.

In one alternative embodiment, an outer sealing layer is attached only after the cutting of the individual hollow body. This can be carried out by pulling a tubular sheath of moisture-tight material on the outside over the individual hollow bodies and securing them to them. Preferably, a shrink tube, formed from a shrink film, pulled over the cylindrical hollow body and formed by heat and the associated reduction in diameter on the can shell. Preferably, the two cut edges of the hollow body are covered by the tubular sheath so that moisture cannot penetrate into this. The placement of the sleeve or of the shrink tube is advantageously carried out before the two end portions of the individual hollow body are formed to the outside. A gluing or fitting of the sleeve or the shrink tube to the hollow body can be carried out before or during the outward-bending of the end portions of the hollow body.

After the individual hollow bodies have been cut off, the outer sealing layer can also be applied by coating them or by wrapping them with a film, in which case the two cut edges of the hollow bodies are preferably also covered by the coating or the film.

The application of the outer sealing layer after cutting off the individual hollow bodies is particularly advantageous if, due to the materials used, in particular the glue and its application amount, the layer structure over the two cut edges of the hollow body would not dry sufficiently if the outside of the layer structure already in the winding system is sealed.

Alternatively to the outer barrier layer in the form of a film, the outermost of the at least two kraft paper layers can already be coated on one side with barrier material, for example paint, on the later outer side before winding.

Less preferably, barrier material, such as paint, can be applied to the outside of the hollow tube or the separated hollow cylinder after production.

For example, an aqueous polymer coating or a UV paint can be used as the paint.

Preferably, the cut edges of the individual hollow cylinders, on which the paper material of kraft paper layers is exposed, are sealed, for example by applying a tape or a film or by coating with a barrier material, such as paint, waterproof glue, or liquid plastic. Particularly preferably, the cut edges are sealed by impregnation, i.e. by applying a liquid which penetrates or is sucked somewhat into the fibre matrix of the kraft paper layer at the cut edges and thus forms a liquid-resistant edge region in the kraft paper. Such an impregnation may also be used if the outermost layer of the can has one (in the case of overlapping) or two (in the case of a butt joint seam) exposed longitudinal absorbent edges.

For impregnation, a polymer mixture in aqueous solution or as an aqueous emulsion is preferably used.

Preferably, the cut edges of the individual hollow cylinders are bent outwardly to facilitate the placement of the bottom element and the cover, or to improve the hold of the bottom element and the cover on the hollow cylinder.

With the present invention, it is achieved that the can shells can be closed with standard covers of aluminium cans and filling and closing the cans in standard filling of aluminium cans is also possible because the can shell does not exceed the necessary maximum layer thickness and in the region of the folded seam, the barrier layer still has permissible deviation of the shell thickness.

Previously, there was a major reservation in the relevant industry that, with a can made of a degradable, non-metallic material, the required compressive strength cannot be achieved, at least not permanently and not securely enough. However, after several years of development, it has now been possible to produce such a container with sufficient compressive strength, which can still be designed in line with the market and can be seamlessly integrated into the systems for the downstream filling of the cans.

For a filler of beverages, the can may be processed with no or relatively little conversion effort to existing plants so that the threshold for product conversion is significantly lower than in composites for pressurised media, in particular carbonated drinks, which require completely new manufacturing, filling and sealing systems.

Due to the lower shell thickness and the at least similar shape, the can is more similar to an aluminium can visually and haptically so that the consumer does not recognise any difference at first sight or is less sceptical about the new type of packaging.

Somewhat surprisingly, it has been found that the hollow cylinder of the container according to the invention can be produced at plants which are used for the winding of general packaging bodies made of paper or cardboard material if the winding mandrel is shaped or dimensioned according to the can to be produced so that the production costs and the mechanical development effort may be low.

Advantageously, for the production of the hollow cylinder, known winding mandrel systems may be used with the use of a round winding mandrel when the individual layers of the can shell according to the invention are fed laid around the mandrel and preferably glued together over the entire surface, so for the production of the can shell according to the invention, continuously operating standard plants can be used with little adaptation effort. A round structure of the can according to the invention is required so that it can be closed with standard can covers and a cylindrical body is more resistant to pressure than another shape, for example, an approximately rectangular body with rounded corners, which is quite common for the general packaging purpose.

Advantageously, by the construction of the composite can shell according to the invention, a pressure-tight container can be produced at a plant, which was previously used for the packaging of conventional consumer goods. Surprisingly, it has been shown that by using a barrier layer made of a kraft paper layer and a barrier film or a barrier laminate in the preferred thickness range of the invention, the operating speed of the known plant can be advantageously increased since an elongation of the barrier film or the barrier laminate is prevented at the mandrel, which turns out much stronger with straight winding than with spiral winding.

The folded seam may be produced by folding the two edges of the barrier layer away from the winding mandrel and welding them together in film-to-film manner and then folding the welded edges onto one side of the barrier layer and bonding them to the kraft paper layer of the barrier layer itself. Alternatively, the folded seam according to an untested variant could also be formed by first recoiling the barrier layer on itself at one edge and thus gluing or adhering kraft paper layer onto kraft paper layer and thereafter, on the winding mandrel, the unravelled edge of the barrier layer with the barrier film facing downwards is welded or glued to the barrier film of the folded-back edge.

As a result, both methods achieve a tight folded seam with identical construction.

The at least slight displacement of the individual layers known from the prior art has proved to be suitable in order not to produce any structural weakness which would be present in the case of overlapping overlap areas. The known provision of chamfers or steps at the edges of the layers can advantageously take place in the preferably at least two further kraft paper layers of the layer structure according to the invention so that the at least two kraft paper layers overlap themselves, but the overlap region does not lead to an increase in layer thickness.

Instead of wrapping the at least two other kraft paper layers as well as the barrier layer in the longitudinal direction of the mandrel, the at least two further kraft paper layers could also be wound obliquely around the straight wound barrier layer, wherein the displacement areas and the chamfering or grading of the edge areas of the kraft paper may take place. The oblique winding of the at least two further kraft paper layers may take place for each layer in the same direction, or against each other. However, this variant with the obliquely wound further kraft paper layers has the disadvantage that the joint areas or overlap areas of the kraft paper layers intersect the longitudinal seam of the barrier layer, as a result of which weak points can result at these locations. In the case of the opposite winding, the joint areas or overlapping areas of the at least two kraft paper layers also intersect so that weak spots can also result there.

Preferably, therefore, the at least two kraft paper layers are also wound straight.

It has proven to be advantageous if, in addition to known mandrel winding systems, a cooling device for cooling the mandrel is additionally provided. The mandrel is preferably provided with an anti-adhesive surface. By cooling and/or the anti-adhesive surface the use of lubricants can be dispensed with, or their use can at least be limited.

Of particular importance in the present invention is the barrier layer, since this, on the one hand, must not be too thick, otherwise the folded seam would be too thick, which could lead to creeping leaks in the area of the cover and the bottom element, resulting in a later bursting of the pressurised can, since the strength of the kraft paper layers is reduced enormously on contact with moisture. On the other hand, the barrier layer must not be too thin so that it withstands the tensile forces acting in the area of the folded seam so that there is no creeping leakage. The compressive forces acting on the inner gap of the folded seam are converted by the 180° folding of the overlapping regions of the barrier layer into tensile forces acting in the circumferential direction of the can, which are absorbed by the areas of the kraft paper layer of the barrier layer directly glued to one another.

A less preferred or advantageous possible modification emanating from the present invention could be provided in that it uses paper or kraft paper webs laminated with plastic (esp. PE) instead of kraft paper layers on one side or both sides and the connection of the layers together is made by adjacent plastic layers of two layers welded together. Accordingly, at least one layer would have an outer PE film and at least one further layer would have an inner PE film, which are welded together when the layers are applied, in particular on the mandrel in a winding machine, in particular by ultrasonic welding. Of course, all layers could be fixed with plastic-plastic (PE-PE) welding together. Although this alternative embodiment is not claimed in the present application, since it is assumed that this is not as advantageous due to the greater layer thickness of the barrier layer and the poorer hold of the layers to each other, as the claimed alternative embodiment, this unclaimed alternative embodiment is also explicitly addressed and disclosed. In order to arrive at this alternative embodiment, it is theoretically possible to replace the glue with plastic films in at least one or all parts of this description in which glue for bonding two surfaces is mentioned, therefore surfaces to be glued are welded together instead. PE-PE welding is common in the manufacture of beverage cartons, wherein beverage cartons have the disadvantage that they are not suitable for carbonated drinks or for media having or developing strong positive pressure. The layer structure of a beverage carton (barrier layer (PE or PE-Alu-PE)-paper-plastic layer (PE)) could theoretically be used as the innermost layer of a can having a longitudinal seam (simple overlap with internal strip as usual in beverage cartons, or folded seam) in order to wind over it at least one further layer with an inner plastic layer (PE) and an outer cardboard or paper layer, wherein the outermost layer of the layer structure has an outer barrier layer, for example made of PE. Unlike customary beverage cartons, however, the layer structure would be in cylindrical form and closed with suitable closure elements (can bottom and can cover) instead of welding the layer structure to itself at the ends.

DETAILED DESCRIPTION

Figure 1:
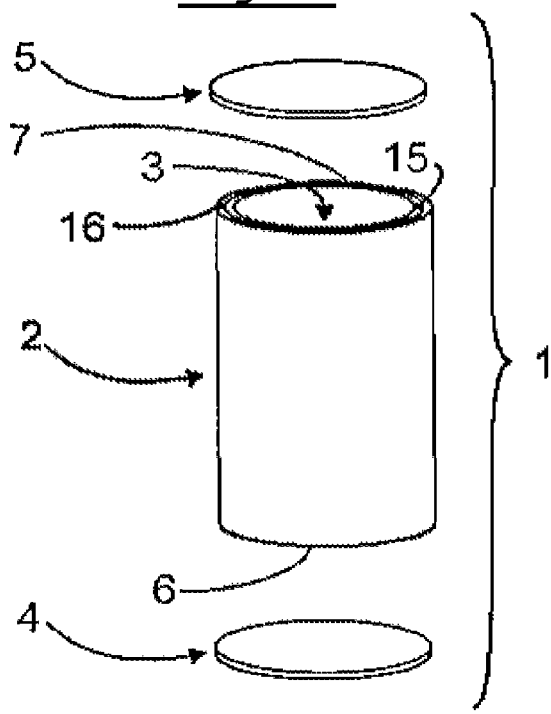
FIG. 1: shows an exploded view of the fluid container according to the invention in the form of a beverage can according to a first embodiment.

Before discussing the individual figures, the fluid container according to the invention should be described in general terms: The fluid container, in particular in its design as a beverage can, is designed as a pressurised container and for this purpose has a hollow cylindrical can body comprising an interior for receiving a beverage, a bottom member and a cover member, wherein the bottom member closes a first longitudinal end of the hollow cylindrical can body formed and the cover member closes a second longitudinal end of the hollow cylindrical can body. The can body comprises at least one wound inner material layer and one wound outer material layer, i.e. at least two wraps or layers of cardboard composite or kraft paper, wherein the layers either extend exactly 360° or, in another embodiment, extend slightly more than an entire wrap. Combinations of layers with exactly one wrap length and those with a little more are possible. These layers are preferably wound at right angles to the axis of the can body to be produced, resulting in a maximum compressive strength, since then the necessary overlaps and thus the seams have a minimum length. Helical windings in which the longitudinal edges of the wound bands are joined together to form tight overlaps and seams, however, require longer seams. Such windings are also referred to as helical windings and they are found so far on cylindrical table bombs or containers for stacked crisps or as a container for all sorts of other suitable goods. The wound inner material layer of the pressure-resistant and preferably also heat-resistant can according to the invention has an axially extending inner seam and is formed by a cardboard composite material or kraft paper layer, which is coated on one side on the side surface facing the can interior with a gas and aroma-tight barrier composite, and the wound outer material layer has an outer seam and is formed by a kraft paper layer, wherein the seam formed by the overlap is preferably offset relative to that of the inner material layer with respect to the circumference of the can. In the presence of a third layer of cardboard composite material, the overlap or seam of which is preferably staggered relative to the seam of the then central layer again with respect to the circumference of the can.

With this fluid container, a beverage container or a cylindrical beverage can is provided in a structurally simple manner and cost, which is characterised by a simple structure and by the use of recyclable materials. Such a beverage can may surprisingly be designed and manufactured to be sufficiently pressure resistant, in particular by consisting of several layers and wraps, so that it can be used for carbonated drinks as well as for non-carbonated drinks and may withstand pressures of up to 11 bar, although it is mainly produced from bare cardboard composite material. Except for a minimal internal coating or barrier layer, the shell consists mainly of cardboard material or kraft paper. This beverage can is food safe. The can body according to the invention consists of cardboard or even paper, namely a kraft paper, and no longer of aluminium. By sealing the inner material layer with the aid of a barrier composite, a perfectly vapour vapor-, aroma-, fat- and oxygen-tight barrier results. This barrier composite is applied, for example, by means of a hot casting method by an extruder. The material used for the barrier composite is a polyolefin layer and at least one layer of a bonding agent. If necessary, a layer of aluminium may additionally be used, in which case the total surface weight of this innermost layer may be approx. 60 g/m² to 130 g/m². In a further alternative, the barrier composite may additionally comprise a layer of ethylene-vinyl alcohol copolymer, whereby a total surface weight of 50 g/m² to 100 g/m² can be achieved.

The kraft paper layer of the outer material layer is preferably coated on one side with a polyolefin layer, on the side facing away from the can interior. This polyolefin layer has a grammage of at least 10 g/m² and at most 50 g/m² and consists of polyethylene PE or polyethylene terephthalate PET. The ideal grammage has been found to be 20 g/m². In this case, the advantageous barrier effect of polyethylene terephthalate PET can be used. This beverage can therefore makes an important contribution to the protection of the environment and the reduction of waste.

In view of the fact that the beverage can serves as a packaging and accordingly there is a desire to label the contents on the outside, the kraft paper layer of the outer material layer is formed on one side on the outer side facing away from the can interior to be printable or paintable in a waterproof manner Thus, external surfaces are available on which advertising messages can be printed or painted. The wound inner material layer and the wound outer material layer are preferably glued together over the entire surface. In this way, it is ensured that the seams remain relatively offset with respect to the circumference of the can and the compressive strength is increased.

In order to increase the stability of this fluid container or beverage can in an environmentally friendly manner, a triple wrapping is advantageously produced by at least one wound intermediate material layer applied between the wound inner material layer and the wound outer material layer, which is also formed by a kraft paper layer, wherein the inner material layer, the at least one intermediate material layer and the outer material layer are glued together on the opposing kraft paper layers over the entire surface. The at least one wound intermediate material layer has an intermediate seam, which is preferably offset relative to the inner seam and the outer seam with respect to the circumference of the winding. The staggered arrangement of inner seam, intermediate seam and outer seam proves to be particularly advantageous in terms of tightness and pressure resistance for filling with carbonated drinks.

Particularly advantageous is a barrier composite of the innermost layer of a polyolefin layer with at least one layer of an adhesion promoter. To increase the mechanical stability of the inner material layer when it comes to achieving a particularly high compressive strength, for pressures of 11 bar and more, the barrier composite may additionally comprise a layer of aluminium and a total grammage of at least 60 g/m² and at most 130 g/m². By choosing the material, however, the weight of the fluid container increases only insignificantly, whereas the inner material layer gains toughness through a suitable choice of material.

Alternatively, to increase the mechanical stability for the barrier composite, instead of a single layer of aluminium, a layer of ethylene-vinyl alcohol copolymer may additionally be employed, and the total grammage is then at least 50 g/m² and at most 100 g/m². Ethylene-vinyl alcohol copolymer also has the properties necessary to form a barrier. In a further alternative embodiment with increased mechanical stability, additionally a layer of polyvinyl alcohol, having a total grammage of at least 50 g/m² and at most 100 g/m² can be used as a barrier composite. In this case, polyvinyl alcohol has a high tensile strength and flexibility.

In view of a low total weight of the fluid container, a kraft paper layer having a grammage of at least 60 g/m² and of at most 180 g/m² is suitable. The bottom element and/or the cover element can be produced for a good pressure resistance of the metal can, preferably made of aluminium, as conventionally.

In the following, the individual figures are described and explained in detail. In FIG. 1, a fluid container according to the invention in the form of a beverage can 1 is shown in a schematic single part illustration. The beverage can 1 comprises a pipe section or a hollow cylindrical can body 2 with a can interior 3 serving to receive the beverage, as well as a bottom element 4 and a cover element 5. The bottom element 4 serves to close a first longitudinal end 6 of the can body 2, wherein the cover element 5 is provided to close a second longitudinal end 7 of the can body 2. The bottom element 4 and the cover element 5 are preferably made of metal, preferably aluminium. Said beverage can 1 may have a height from 100 mm to 250 mm with a diameter from 35 mm to 600 mm, wherein a height from 100 mm with a diameter from 45 mm to 70 mm is preferred.

Figure 2:
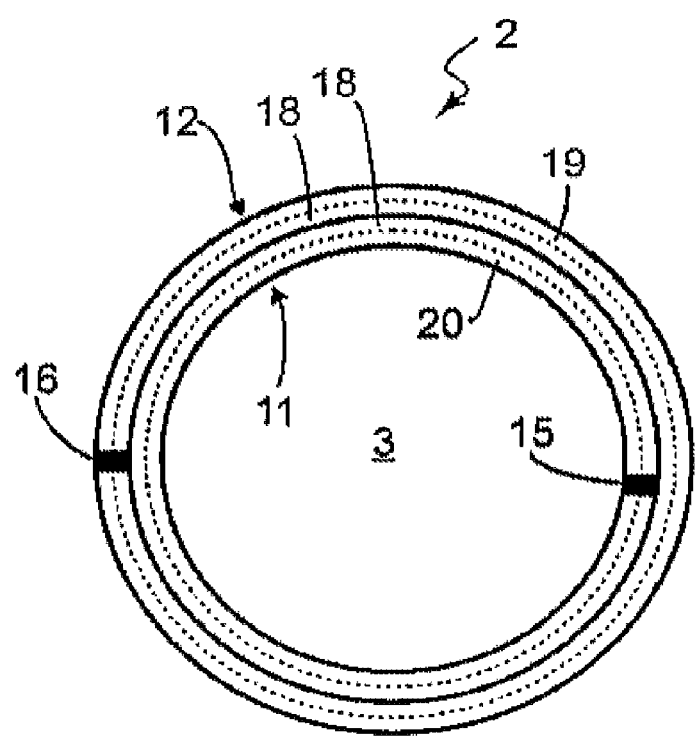
FIG. 2: shows a schematic sectional view through a beverage can from FIG. 1 made of two layers shown greatly enlarged.

FIG. 2 shows a first variant with a two-layered can body in a cross section, with layers shown greatly enlarged, in principle. A first kraft paper layer 18 with an in-line polyolefin layer as a barrier composite is wound around inner layer 11 around a central cylindrical steel mandrel, and with a first seam 15, the winding-direction edges are glued or welded. A second kraft paper layer 18 is subsequently wound as an outer material layer 12 onto the first layer 11, in such a way that the edges lying in the winding direction are welded or glued to the seam 16 on a side of the can body 2 opposite the seam 15 so that a can body 2 with a hollow can interior 3 is created.

Figure 3:
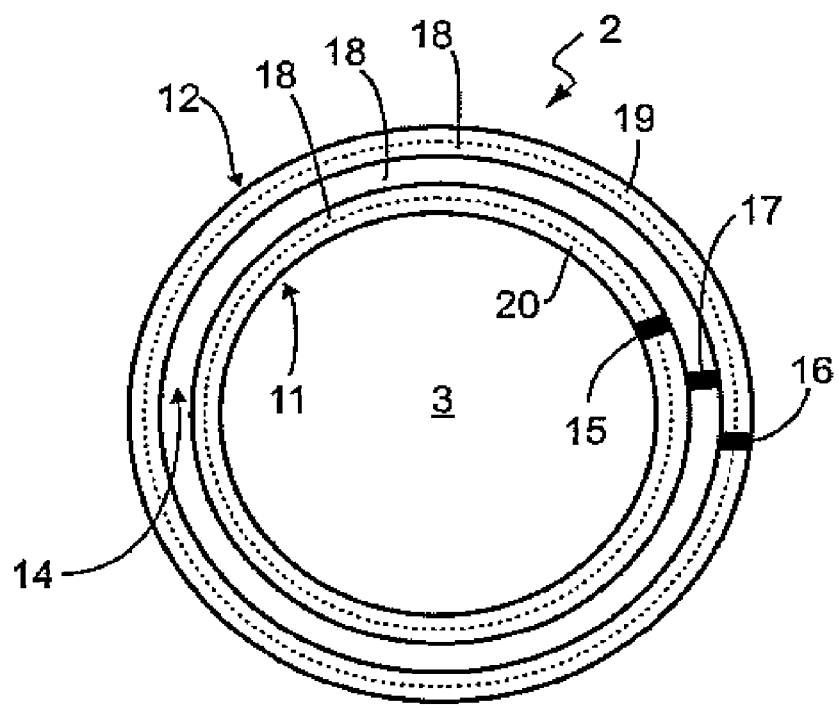
FIG. 3: shows a schematic sectional view through a beverage can according to a second, three-layer embodiment with greatly enlarged layers shown.

In FIG. 3, a second embodiment of the beverage container 1 is shown in a cross section through the can body 2 so that it can be seen that this second embodiment of the first embodiment of FIG. 2 differs in that the structure of the can body 2 in this second embodiment has three layers of material 11, 14, 12, instead of only two layers. The following description applies to both embodiments, with the differences between the two embodiments being addressed.

In both embodiments, which are illustrated in FIGS. 2 and 3, the can body 2 comprises a wound inner material layer 11 and a wound outer material layer 12. In the second embodiment according to FIG. 3, a further material layer is present, namely a wound intermediate material layer 14, which is arranged between the inner material layer 11 and the outer material layer 12. It is also possible for more than one intermediate material layer 14 to be arranged between the inner material layer 11 and the outer material layer 12, wherein it has been shown that three intermediate material layers 14 represent a kind of maximum and a further increase in the number of intermediate layers is not necessary for increasing the stability.

The inner material layer 11, the outer material layer 12 and, in the second embodiment, the intermediate material layer 14 are unwound from material web rolls. Then, preferably in a machine, their edge regions are ground so that they form either an inclined surface or a step so that the later overlapping edge regions are not thicker than those of the cardboard composite material layer itself. After that, the material webs are wound transversely to their course direction and at right angles to the can body 2 around a mandrel 23, for the production of the can body 2 and the later closed can 1. The then overlapping edge regions of the individual material layers are connected to one another in a form-fitting manner by gluing. Consequently, the wound inner material layer 11 has an inner seam 15 and the outer material layer 12 has an outer seam 16. Accordingly, in the second embodiment, the intermediate material layer 14 has an intermediate seam 17.

For the function and aesthetics of the fluid container, in particular also a beverage can, it is advantageous if the individual seams 15, 16 and optionally 17 are not arranged on identical circumferential positions, as shown in FIG. 3, but that the inner seam 15, the outer seam 16 in the first embodiment of FIG. 2 and in the second embodiment of FIG. 3, the intermediate seam 17 are additionally arranged at different circumferential positions after the material layers 11, 12 and optionally 14 are glued together. Whether the inner seam 15 is arranged offset by 180° to the outer seam 16, as shown in FIG. 2, or whether the seams 15, 16 and 17 are offset by only approx. 15° to each other, as shown in FIG. 3, does not matter as much. It is advantageous that the seams 15, 16 and optionally 17 are arranged relatively offset from one another and are not located on the same circumferential position of the can body 2.

As the base material, the inner material layer 11 and the outer material layer 12 are each formed by a kraft paper layer 18, wherein—if present—the intermediate material layer 14 is formed by a kraft paper layer 18. In this case, a respective kraft paper layer 18 preferably has a grammage of at least 40 g/m$^2$ and of at most 180 g/m$^2$, wherein a grammage of at least 80 g/m$^2$ and of at most 120 g/m$^2$ is preferred. As an alternative base material, a sack paper with a high tensile strength is also considered.

In both embodiments, according to FIGS. 2 and 3, the kraft paper layer 18 of the outer material layer 12 is coated on one side on the outer side surface facing away from the can interior 3 with a polyolefin layer 19 as a barrier composite. This two-layer structure of the outer material layer 12 is schematically indicated by the dashed line, wherein the representation of FIGS. 2 and 3 do not reflect the real layer thicknesses. The polyolefin layer 19 preferably has a grammage of at least 10 g/m$^2$ and at most 40 g/m$^2$, wherein a grammage of 20 g/m$^2$ is preferred. In addition, the polyolefin layer 19 may be equipped with or without semi-permeable properties. As an alternative to the polyolefin layer 19 (not shown) the kraft paper layer 18 of the outer material layer 12 may be printed or painted on one side on the outer side surface facing away from the can interior 3.

Furthermore, in both embodiments, according to FIGS. 2 and 3, the inner material layer 11 is coated on one side with a gas-tight and aroma-tight barrier composite 20 on the side surface facing the can interior 3. Again, the two-layer structure is schematically indicated by the dashed line in the respective figures. The barrier composite 20 itself is preferably in turn multi-layered and comprises a polyolefin layer and at least one layer of a bonding agent. In addition, the barrier composite 20 may then have a layer of aluminium, ethylene-vinyl alcohol copolymer or polyvinyl alcohol. In the case of an additional layer of aluminium, the barrier composite 20 preferably has a total grammage of at least 60 g/m$^2$ and at most 130 g/m$^2$, preferably of 110 g/m$^2$. In the case of an additional layer of ethylene-vinyl alcohol copolymer or of polyvinyl alcohol instead of aluminium, the barrier composite 20 preferably has a total grammage of at least 50 g/m$^2$ and at most 100 g/m$^2$, preferably of 70 g/m$^2$.

Taking the above layer structure into consideration, it can be seen that in the first embodiment according to FIG. 2, the wound inner material layer 11 and the wound outer material layer 12 are glued together over the entire surface on the opposite side surfaces of the respective kraft paper layers 18. In the second embodiment according to FIG. 3, the inner material layer 11, the intermediate material layer 14 and the outer material layer 12 on the opposing kraft paper layers 18 are glued together over their entire surface.

In summary, this exemplary fluid container described as a beverage can is made primarily of cardboard material and is suitable for both non-carbonated and carbonated drinks. It is a preferably three-piece, linearly manufactured, primarily—for a uniform pressure absorption—cylindrical fluid container, although other forms are theoretically possible, such as the shape of a 5-litre beer keg. The fluid container comprises respectively a can body 2 made of a multi-layer cardboard and barrier cardboard composite and a bottom element 4, preferably made of metal, preferably aluminium, and a cover element 5 preferably made of metal, preferably also aluminium. The cover element 5 is further provided with a known device for opening, preferably a pull-ring, wherein optionally means may be provided which allow re-closing.

Figure 4:
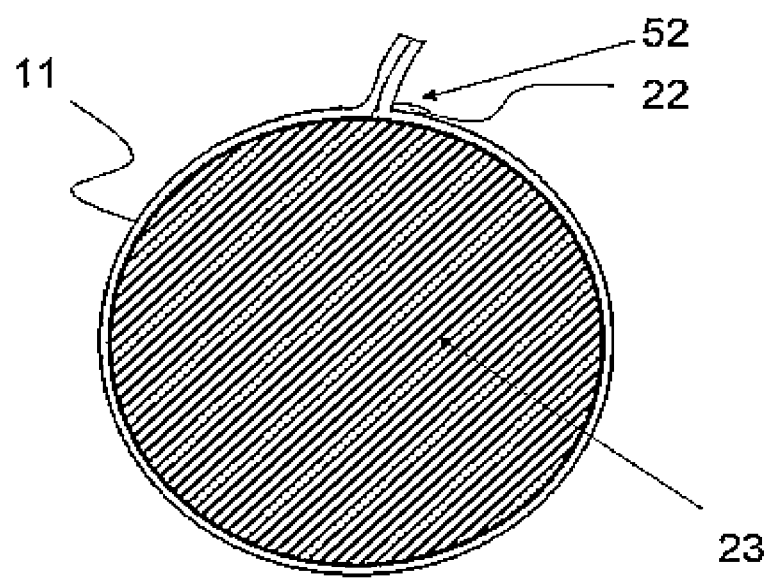
FIG. 4: shows a schematic sectional view through a beverage can with a first layer with a barrier layer on its inside, wherein the two edge regions of the layer overlap the winding, are led to the outside, then are welded together with the barrier layers and then applied by means of glue on the wound layer and become glued.
Figure 5:
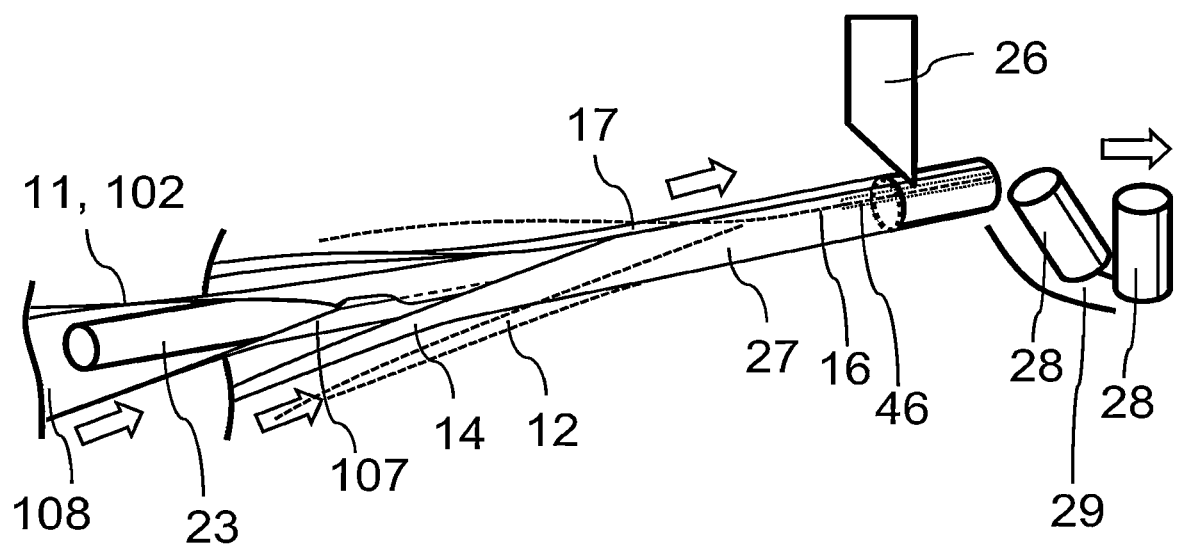
FIG. 5: schematically shows the manufacturing process of cylindrical can shells.

For production, the innermost winding, i.e. the innermost layer 11 acting as a barrier web, is formed around a mandrel 23, as shown in FIGS. 4 and 5. In this case, the edge regions of the layer which project beyond the circumference of the winding are preferably folded outwards, so that the inner barrier layers, for example PE, abut each other. Then, these barrier layers of the two edge regions are welded together by means of an induction or ultrasonic welding. Thereafter, the two welded-together edge regions are pivoted together on one side of the layers. The edge area on the right-hand side of the image is thus flipped by 180°. Its kraft paper surface meets the kraft paper surface of the wound layer and the channel 52 formed during pivoting is provided with glue 22 so that the two welded-together edge regions are firmly glued to the wound layer and thus sealed. The web therefore does not have a joint-to-joint measure for this gluing, but deliberately creates a three-layer overlap of about 8 mm wide. Because the channel 52 is filled with glue 22, a transport of liquid in the course of the subsequent filling process is effectively avoided.

A next layer 14 of cardboard composite material is wound simultaneously and spatially offset slightly as shown in FIG. 5 around the mandrel 23 and the existing layer 11, which has been connected here according to the version of FIG. 4, and the next layer 14 is connected thereto with bonding. The edge regions of the second layer 14 are preferably ground stepwise so that they can be positively connected to each other by overlapping, and this overlap is glued to form a central seam 17. In FIG. 5 it is also shown that a third layer 12 of cardboard composite material, i.e. the outer layer, also temporally and locally very slightly offset around the then central layer 14, may be wound and the positive overlap may also be glued to form the outer seam 16. The outermost layer may be coated with an outer material, for example, with a layer with very fine holes, so that water vapour may escape from the can body, while conversely, no penetration of water vapour into the can is possible. This coating is preferably polyethylene PE, polypropylene PP or polyethylene terephthalate PET. The outermost seam 16 can be sealed with a sealing strip (shown dotted) made of PE, PP, PET with/without bonding agent or adhesive and this sealing strip is applied depending on its form with or without heat. Instead of sticking a strip 46 onto the resulting continuous tube 27 moving on the mandrel 23, the seam 16 of the outermost layer may be sealed by means of hot and thus liquid PE.

For the industrial production of cans made of cardboard composite material this material is supplied in the form of prefabricated sheets of kraft paper with its respective coating in rolls, the material is unrolled from these and fed to the winding device illustrated in FIG. 5. In the example of FIG. 5, for example, three rollers would be present as webs for the three layers 11, 14 and 12 to be wound. After unrolling, preferably the edge regions of the webs 14, 12 are ground by a machine to produce an inclined surface 44 or a step 21. It is mainly these rollers, together with the glue and the bottom and cover elements, which can be supplied to the can filler for the production of the fluid containers, but no empties and thus no more bulky goods.

Before being supplied to the winding device, the webs 11, 14, 12 are coated on one of its flat sides with an adhesive, preferably glue.

Thereafter, as shown in FIG. 5, the "continuous" webs of the individual layers 11, 14, 12, i.e. those first to form the innermost layer 11, are wound by a machine station around a steel mandrel 23 by feeding and pulling the layers along the stationary, cylindrical steel mandrel 23. The material webs run between the steel mandrel 23 and a plurality of contiguous rollers (not shown), each with a U-shaped cross section. With the innermost layer 11, the welding of the outwardly projecting edges takes place at its barrier layer, as shown in FIG. 4. Next the innermost layer 11 wound into a tube advances over a further section of the steel mandrel 23. Contact rollers (not shown) hold the innermost layer 11 fed on the mandrel 23, and the welded seam produced by induction or ultrasound is folded and pressed so that it is bonded to the outside of the cardboard composite material of the innermost layer 11. The then finished innermost layer 11 is conveyed onto the mandrel 23.

Next, the central layer 14 is applied to the innermost wrapping or layer 11 locally on the same machine just behind the innermost layer 11. The inclined surface 44, preferably cut into a step 21 or longitudinal edges of this central layer 14, are brought to overlap by the winding of the mandrel 23 and are glued by means of the previously applied glue. And finally, the outer layer is also applied at the same time and locally slightly set back on the previously wound layer 14.

The pipe 27 made of cardboard composite material, which is made of three bonded layers and shown in FIG. 5, is then forwarded to a cutting device 26, for example, a clocked back and forth guillotine, as shown in FIG. 5, which at desired locations cuts the pipe 27 into pipe sections 28. The cutting can be carried out not only with a preferably mobile guillotine, but also with a known multi-rotary blade machine. In this case, a carriage with several rotary blades moves at the production speed with the continuous tube 27 and can thus cut several pipe sections 28 in one operation. After cutting, the can sections 28 preferably pass through a heat tunnel to remove glue moisture. The heat can be generated in various ways. Preference is given to hot air.

Figure 6:
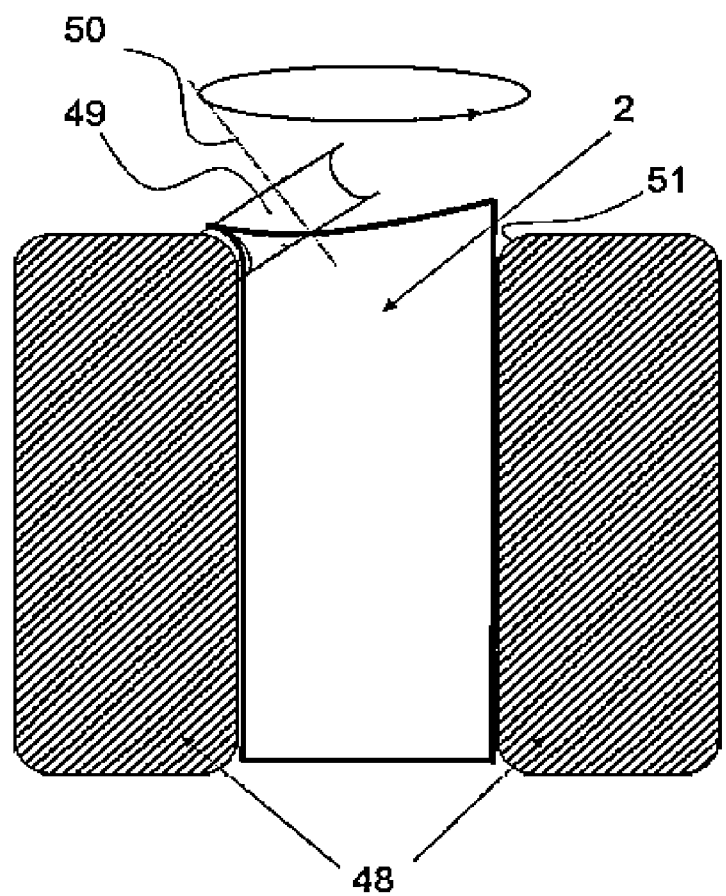
FIG. 6: schematically shows the bending of the edges of the can shell.
Figure 10:
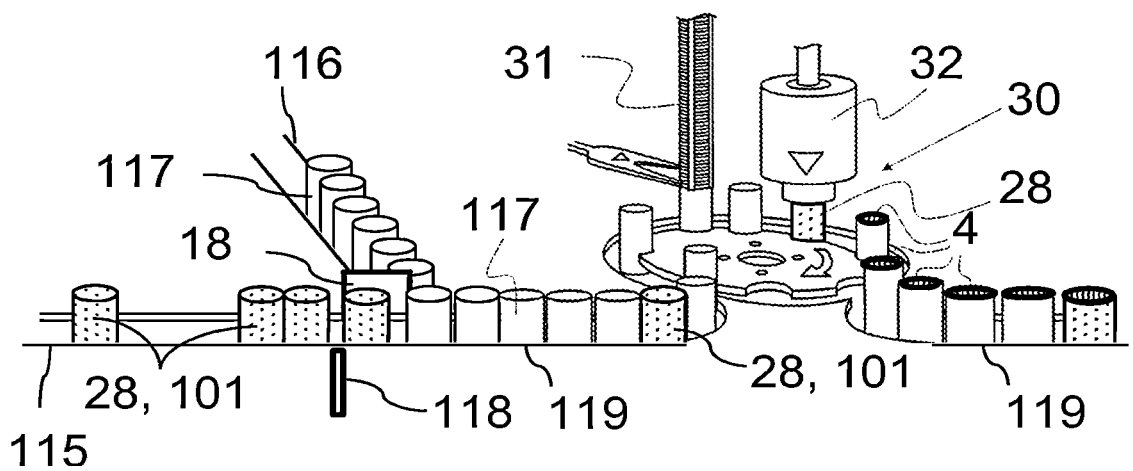
FIG. 10: schematically shows a first section of a plant according to the invention for filling cardboard or paper composite can shells and/or aluminium can shells.

After cutting the pipe sections 28 to the desired length, depending on the desired can volume, the cut edges of the open ends of the pipe sections 28 are formed in projections by a machine. For this purpose, rotating spreading tools are inserted from both sides into the open ends. FIG. 6 shows a possibility for this spreading. The can body 2 is inserted into a hollow cylinder 48, which has rounded inner edges 51. With a steel roller 49, which rotates about the axis 50, this curved inner edge 51 is retracted, wherein the axis 50 is moved so that it defines a cone wall. The steel roller 49 rolls the upper edge portion of the can body 2 in one or more passes on the curved edge 51 and spreads the layers slightly. The result is a projection, as shown in the following FIG. 7. The cut edges are preferably sealed after this carding or the spreading is carried out by painting with a dispersion adhesive, for example a liquid polyethylene PE or a dispersion adhesive or other suitable fast-setting and food grade adhesive so that moisture cannot penetrate into the interior of the kraft paper layer, since the subsequent filling inevitably takes place in a humid atmosphere. The cut edges are then once again treated with heat to minimise the setting time. For this purpose, infrared radiation is preferred at this point. Thereafter, these tube sections 28 are arranged in an upright position in a row in a transport device and then pass through a carousel 30, as shown in FIG. 10, on which a machine 32 initiates an isolated closure element, e.g. a bottom element 4, from a supply magazine 31, in the open top side of each pipe section 28 and forms the outer edge region of the radially outgoing bottom edge of the closure element in the radial direction around the edge region of the open pipe section 28 in a seal tight manner.

Figure 7:
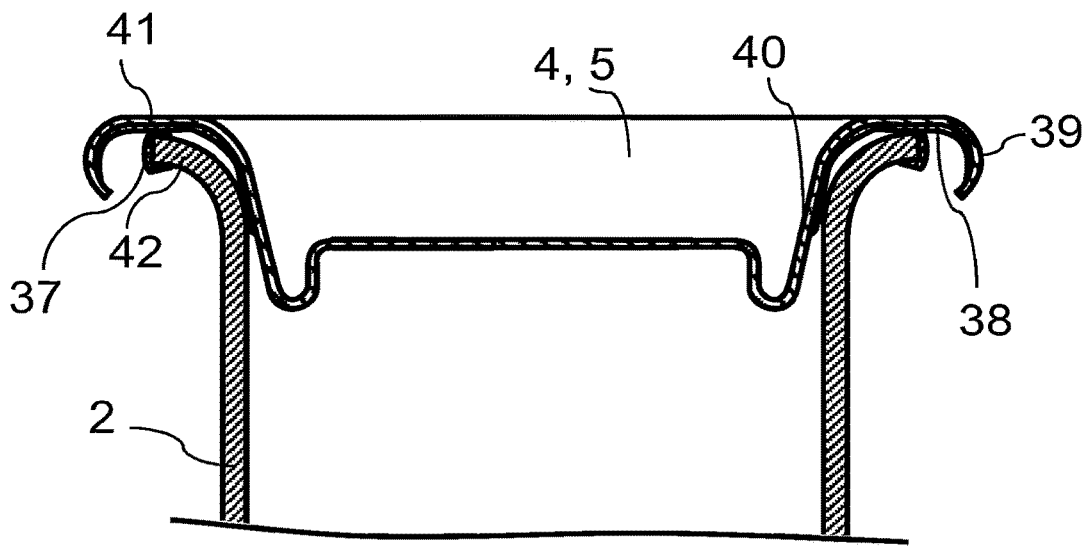
FIG. 7: schematically shows the placement of a closure element.

FIG. 7 illustrates this process of tightly crimping a closure element in the form of a bottom element 4 or cover element 5. The bottom element and cover elements may be standard bottoms or standard covers which are used to seal conventional aluminium cans and which can then be assembled with the same machines. The bottom element 4 or cover element 5 is made of aluminium and has a radially protruding edge region 41, i.e., an area that projects beyond the diameter of the can body 2. The bottom 4 or cover element 5 with the edge region 41 is brought to overlap with the edge region 42 of the can body 2 by a machine. After that, the crimping is carried out by the machine 32, which for this purpose crimps the cantilevered two-layer sections 41, 42, i.e., the edge portion 41, together with the edge portion 42 of the can body, i.e., rolls it by approx. 360° or more, creating a tight formed seam. As shown in FIG. 7, the cut edge of the can body 2 is a seal 37, which consists of moisture-tight material. The cover element 5 or bottom element 4 usually has a composite material 38, which is an elastic sealing material, which is applied in the region of the protruding edge region 41 which faces the edge region 42 of the can body 2.

Preferably, the composite material 38 extends from the inside of the curl 39 (outermost downward curvature of the edge) of the cover element 5 or bottom element 4 to the shoulder 40 of the cover element 40, wherein the composite material 38 at least partially extends over the height of the shoulder 40 and at least partially beyond the inner radius of the curl 39. Preferably, the composite material 38 extends at least over half the height of the shoulder 40.

Figure 8:
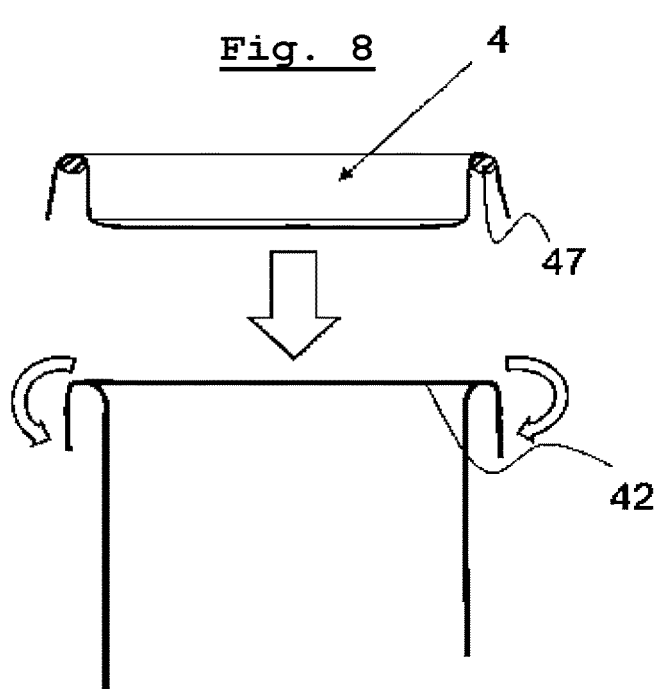
FIG. 8: illustrates another variant of a preformed contour in a diametric section, with a silicone-based sealing ring.

FIG. 8 shows an alternative bottom or cover 4, which is shown here in a diametric section. As can be seen, a silicone-based sealing ring 47 is inserted in the downwardly open channels formed by it. The cover is then installed as in a conventional aluminium can, with the same machines. The silicone seal provides additional proper tightness and the overlapping areas are rolled inwards together.

Figure 11:
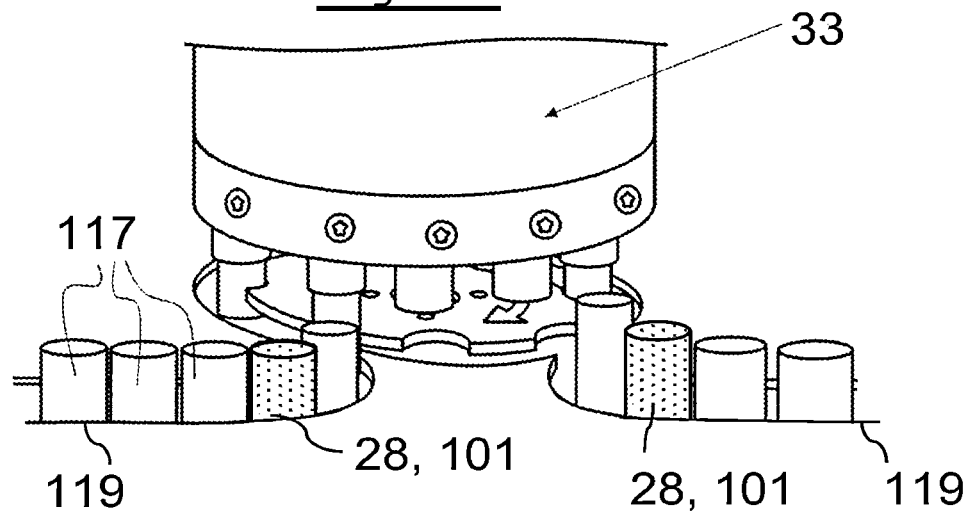
FIG. 11: schematically shows a second section of a plant according to the invention for filling cardboard or paper composite can shells and/or aluminium can shells.
Figure 12:
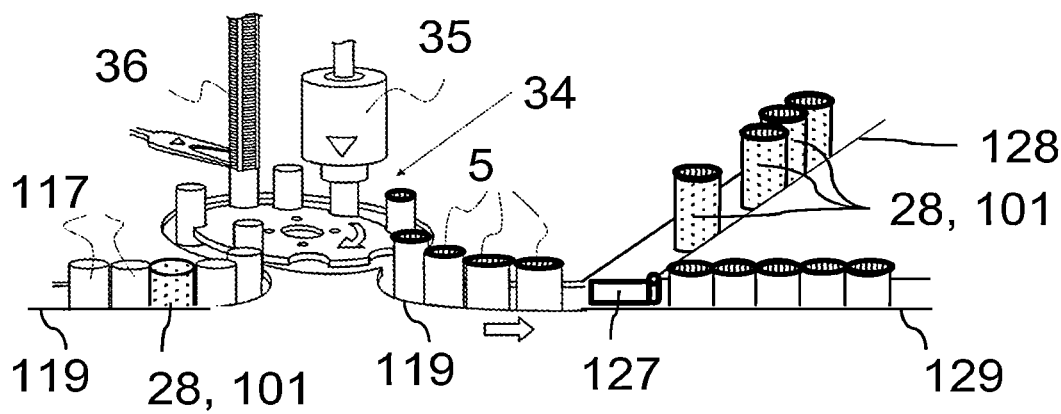
FIG. 12: schematically shows a third section of a plant according to the invention for filling cardboard or paper composite can shells and/or aluminium can shells.

FIG. 10 shows a rotary transfer machine 32 with a carousel 30, which mounts bottom elements on the can bodies and crimps the edges of the bottom elements with the edges of the can bodies, as described above. Next the unilaterally open pipe sections 28 are turned upside down in the conveyor channel, so that their open side is facing up, as shown in FIG. 11. Then they pass through a carousel filling station 33, which fills each pipe section 28 with a defined filling quantity. Finally, as shown in FIG. 12, the filled tube sections 28, which are closed at the bottom, pass through a carousel 34, on which a machine 35, from a supply magazine 36, inserts a singular cover element 5 with pull ring closure into the open top side of each filled tube section 28 and, in turn, the edge of the cover element 5 radially projecting in the radial direction is crimped in a sealing manner around the edge region of the open pipe section 28.

Figure 9:
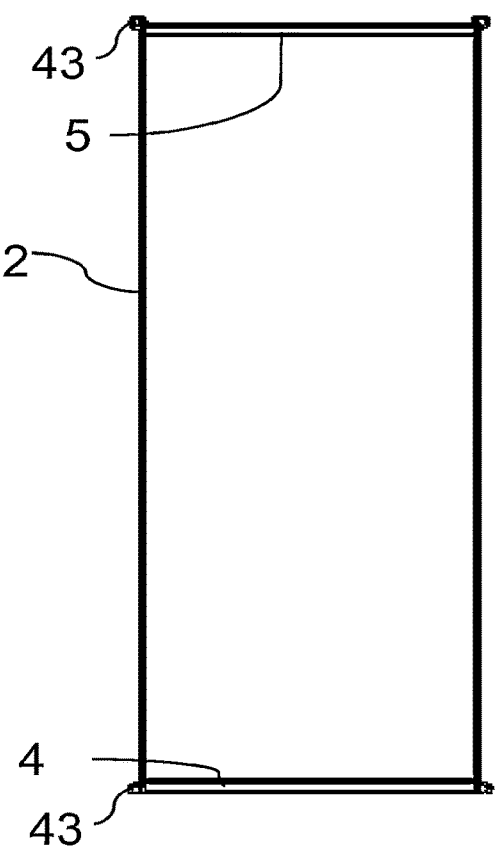
FIG. 9: illustrates the finished can in a longitudinal section in elevation, with the beaded tight edges on the bottom and cover.

A filled and sealed container 1 presents itself later as shown in FIG. 9, where it is shown in a section along its longitudinal axis. The can body 2 and the flanges 43 above and below can be seen with which the cover 5 and the bottom 4 are fixed in a sealed manner.

Figure 13:
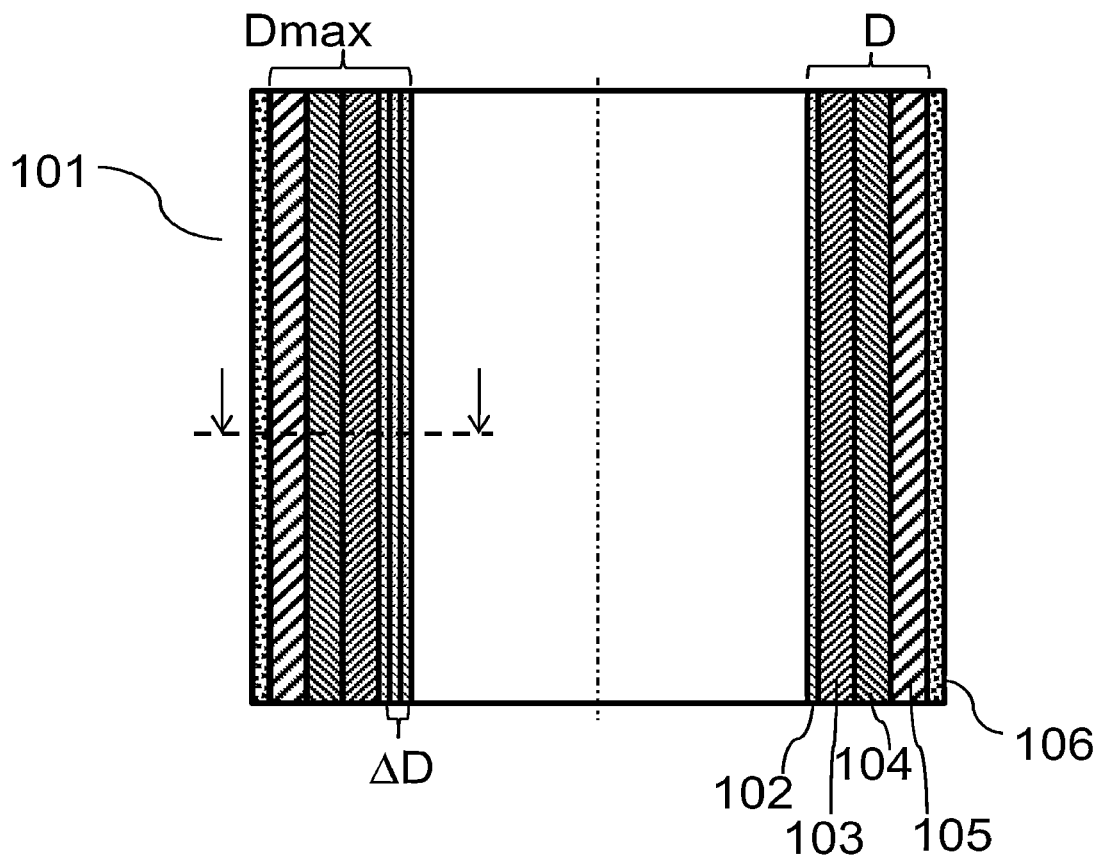
FIG. 13: shows a longitudinal section through a particularly preferred embodiment of the cylindrical can shell according to the invention.

In FIG. 13, a particularly preferred can shell 101 is shown in longitudinal section through the cylindrical container. The can shell 101 has, from the inside to the outside, a barrier layer 102, an inner kraft paper layer 103, a central kraft paper layer 104, an outer paper or kraft paper layer 105 and an outer barrier layer 106.

The barrier layer 102 has, at one point of the circumference, a folded seam running in the longitudinal direction of the can shell 101, wherein in the folded seam three layers of the barrier layer 102 come to lie one above the other.

In the area of the folded seam, the can shell 101 has the maximum thickness Dmax, which is greater than the remaining thickness D of the can shell 101, namely twice the thickness of the barrier layer 102. The thickness difference ΔD is therefore twice the thickness of the barrier layer 102.

While the difference in thickness hardly plays a role in conventional packaging, in the case of pressure-resistant cans it is crucially important whether the can remains tight in the area of the cover, or whether over time moisture can penetrate the kraft paper layer 103 in the region of the thickness difference, i.e., in the region of the folded seam between the cover and the barrier layer 102. It has been attempted according to the prior art to make the barrier layer 102 as thin as possible, or to hide its folded seam with an intermediate layer. The hiding of the folded seam is procedurally complex and may lead to a weak point since there is a large gap between the two edges of the intermediate layer, in which the folded seam is placed. According to the prior art, the barrier layer 102 may also be designed as a film, usually plastic aluminium or a composite film, that is as thin as possible, with the disadvantages that they are less simple or slower to process and that they themselves have low strength, or may be subject to creeping deformations.

Notwithstanding the prior art, the invention provides for the barrier layer 102 to be designed as a composite of a kraft paper layer 107 and a barrier film or as a composite of a kraft paper layer 107 and a barrier laminate 108 of a plurality of film layers. Although this inevitably leads to an intrinsically disadvantageous increase in the thickness difference in the region of the folded seam, it advantageously leads to the barrier layer 102 being able to be wound better and the folded seam being more stable.

Preferably, the length of the overlap of the folded seam in the circumferential direction of the can shell 101 is between 1 and 6 mm, particularly preferably between 2 and 4 mm, in particular 3 mm.

Figure 14:
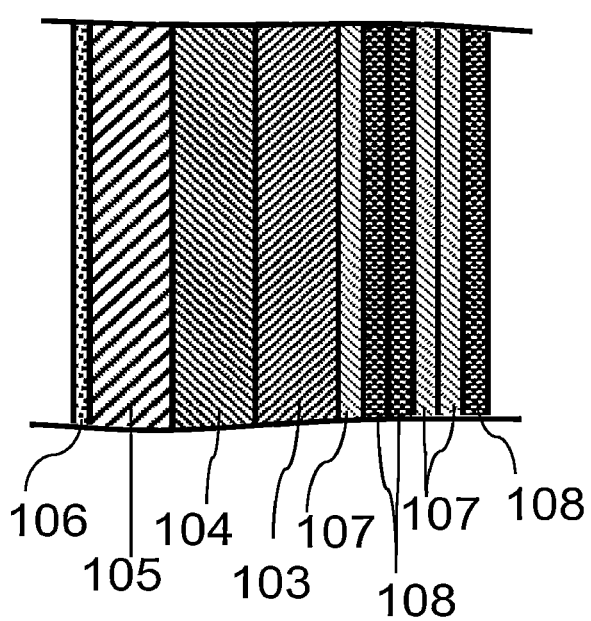
FIG. 14: shows the layer structure in a detailed view of the longitudinal section through the particularly preferred embodiment of the cylindrical can shell according to the invention.
Figure 15:
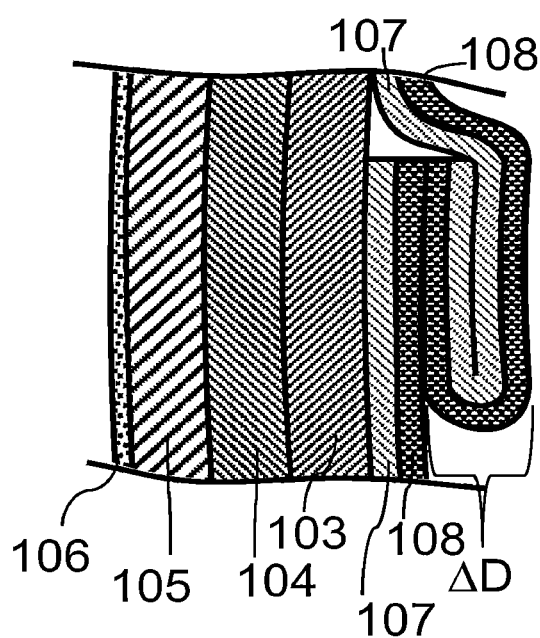
FIG. 15: shows the layer structure of the cylindrical can shell according to the invention in a detailed view of a cross section through the longitudinal folded seam of the barrier layer.

In FIGS. 14 and 15, the particularly preferred can shell 101 is shown in detail, wherein here the barrier layer 102 is shown as a composite according to the invention of a kraft paper layer 107 and a barrier laminate 108. It is particularly advantageous for the barrier layer 102 according to the invention that no foreign material is to be bonded together during the production of the folded seam since non-type bonding, for example of paper material and plastic, generally requires more specific adhesives and/or more time and leads to weaker bonding than gluing paper on paper or plastic on plastic.

As shown in FIGS. 14 and 15, the innermost layer of the can shell 101 is formed by the barrier laminate 108 laminated on the kraft paper layer 107. The bonding of the barrier laminate 108 and the kraft paper layer 107 already takes place before the winding of the cylindrical can shell 101. The material of the barrier layer 102 is preferably produced in the form of the composite of the kraft paper layer 107 and the barrier laminate 108, subsequently wound into a roll and then provided as a roll for the winding process of the cylindrical can shell 101.

In the area of the folded seam, the barrier layer 102 has a threefold overlap with itself. In the area of the folded seam, the barrier laminate 108 is thus, seen from the inside to the outside, followed by a kraft paper layer 107, wherein these are already firmly bonded to each other before winding. The kraft paper layer 107 is adjoined by a further kraft paper layer 107, wherein these are preferably adhered to one another immediately before or during winding, in particular by gluing. The further kraft paper layer 107 is followed by a barrier laminate 108, wherein these are already firmly connected to each other before winding. The barrier laminate 108 is followed by another layer of barrier laminate 108, wherein the two layers of barrier laminate 108 are connected to one another during the winding process, preferably by welding. The further layer of barrier laminate 108 is again followed by a kraft paper layer 107, which forms the outermost layer of the folded seam. The outer layer of the barrier layer 102 is thus formed over the entire circumference by the kraft paper layer 107. The kraft paper layer 107 is untreated on the outside, i.e. not painted or laminated, so that the outside is formed by kraft paper material.

The inner kraft paper layer 103 is placed around the outer side of the barrier layer 102 during the winding process, wherein it is not treated i.e. not coated or laminated on the inside and on the outside. The inner side of the inner kraft paper layer 103 is glued over its entire surface with the outer side of the barrier layer 102 so that here kraft paper material is glued directly with kraft paper material so that glue can penetrate into the fibre matrix of both layers, whereby a particularly high final strength of the adhesive bond is achieved.

Less preferably, other adhesives such as hotmelt adhesives or two-component adhesives, may also be used, wherein the lower final strength of the hot melts and the difficulty of processing the two-component adhesives may be cited as significant disadvantages over glue or water based adhesives. Glues herein are understood to be aqueous solutions of adhesives. In particular, known paper glues can be used.

Less preferably, a combination of two or more different adhesives may be used, which could be used together for bonding two layers, or respectively for bonding different layers. For example, hotmelt and water-based adhesive can be applied side by side on a layer for bonding two layers together.

Figure 16:
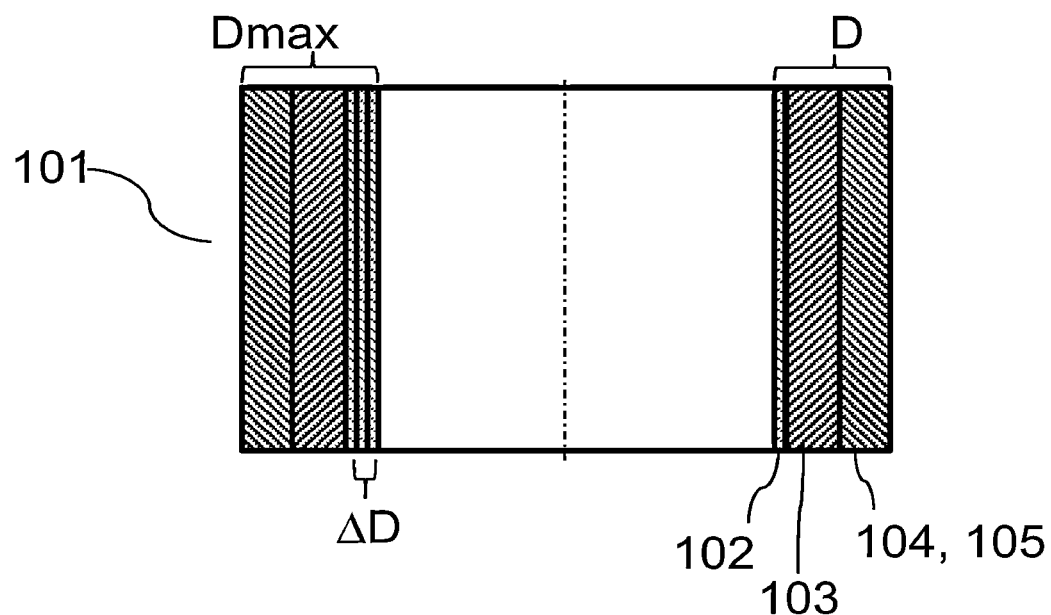
FIG. 16: shows a longitudinal section through an alternative embodiment of the cylindrical can shell according to the invention with a barrier layer and two kraft paper layers.

As shown in FIG. 16, at least one further kraft paper layer 104 is placed around the outer side of the inner kraft paper layer 103 during the winding process, wherein this is not treated, i.e. not coated or laminated on the inner side.

The use of at least two kraft paper layers 103, 104 is more complex and associated with higher material costs than using only a thicker kraft paper layer for the can shell; however, it is advantageous that the two thinner kraft paper layers can be processed faster on the winding machine and that the stability of the can body could surprisingly even be increased compared to the use of one thicker layer.

Preferably, two kraft paper layers 103, 104 and an additional paper or kraft paper layer 105 are used, as shown in FIGS. 13-15, wherein the inner kraft paper layer 103 and each central kraft paper layer 104 are uncoated on both sides and the outer paper or kraft paper layer 105 is preferably untreated or uncoated at least on the inside.

A particularly preferred can shell is manufactured with a height in the range from 130 mm to 150 mm and an outer diameter in the range from 50 mm to 60 mm and an inner diameter range from 48.6 mm to 58.6 mm.

A particularly preferred sealed can has the dimensions: outer height 134 mm, inner height 133 mm, outer diameter 52.4 mm, inner diameter 51.2 mm, inner volume approx. 270-275 ml, filling volume 250 ml.

As described, the can has a barrier layer 102 as the innermost layer, which is formed from film material and kraft paper. The film material is preferably a composite film comprising an aluminium foil and at least one plastic film, which together form the barrier laminate 108. The barrier laminate 108 preferably has an aluminium foil, particularly preferably with a layer thickness from 6 to 9 µm, which is present between two plastic layers so that the barrier layer 102 has the structure of plastic layer, aluminium layer, plastic layer, kraft paper from the inside to the outside.

The barrier laminate 108 preferably has the structure of plastic film, preferably PE, aluminium foil, adhesion promoter preferably in the form of Surlyn, plastic film preferably PE from the inside to the outside. The individual layers of the barrier laminate 108 particularly preferably have the following thicknesses: plastic film 10-25 µm, bonding agent 2-5 µm, aluminium foil 6.5-7.5 µm, plastic film 10-25 µm.

The barrier laminate 108 preferably has a thickness from 30 µm to 55 µm. The barrier laminate 108 has a particularly preferred thickness of 35-50 µm, in particular 40-45 µm. Preferably, the barrier laminate 108 has a grammage of 45 to 75 $g/m^2$, in particular 50 $g/m^2$ to 65 $g/m^2$.

The kraft paper layer 107 of the barrier layer 102 preferably has a thickness from 60 µm to 90 µm. The kraft paper layer 107 of the barrier layer 102 particularly preferably has a thickness of 70-85 µm. The kraft paper layer 107 of the barrier layer 102 preferably has a grammage of 40 $g/m^2$ to 80 $g/m^2$, in particular 50-70 $g/m^2$, in particular 60 $g/m^2$.

The barrier layer 102 has a preferred layer thickness of 90 µm to 145 µm. The barrier layer 102 has a particularly preferred layer thickness of 110-135 µm.

The tensile strength MD of the kraft paper of the kraft paper layer 107 is preferably at least 4 kN/m, in particular at least 5.0 kN/m. The tensile strength CD of the kraft paper of the kraft paper layer 107 is preferably at least 2 kN/m, preferably at least 2.5 kN/m.

In a second embodiment of the barrier layer 102, this has, from the inside to the outside, the structure of the barrier laminate 108 with the layers: plastic layer in the form of a heat-sealing paint, preferably PET; aluminium layer in the form of an aluminium foil; plastic layer in the form of adhesive and kraft paper layer 107 made of kraft paper. The kraft paper of the kraft paper layer 107 preferably has a grammage of 40 $g/m^2$. The heat sealing lacquer preferably has a grammage of 1.6 $g/m^2$, the aluminium foil, a layer thickness of 7.7 µm and a grammage of 20.8 $g/m^2$, and the plastic layer of adhesive, a grammage of 2 $g/m^2$. Overall, this barrier layer 102 has a layer thickness of about 60 µm and a grammage of about 65 $g/m^2$.

The barrier layer 102 is wound around a mandrel in the longitudinal direction to form a folded seam so that it forms a tubular body, with the inner plastic film of the barrier laminate 108 facing the mandrel and the kraft paper layer 107 facing away from the mandrel.

The next layer, i.e., the inner kraft paper layer 103, particularly preferably has a grammage of 125 $g/m^2$, a tensile strength MD of >12 kN/m and a thickness of 0.160 µm. The kraft paper is untreated on both sides. Preferably, the inner kraft paper layer 103 has a grammage of 95 $g/m^2$ to 135 $g/m^2$ and/or a tensile strength of greater than 10 kN/m and/or a thickness of 0.140 mm to 0.175 mm.

The kraft paper layer is bonded directly and completely to the kraft paper layer 107 of the barrier layer 102, in particular by gluing, by being wound around the tubular body of the barrier layer 102.

For gluing, glue, preferably polyvinyl acetate, is preferably applied to the outside of the barrier layer 102 or the inside of the inner kraft paper layer 103 in an amount of 10 to 25 $g/m^2$, in particular 15 to 20 $g/m^2$.

The next layer is the central kraft paper layer 104 by way of example with a grammage of 125 $g/m^2$, a tensile strength of >12 kN/m and a thickness of 0.160 mm. The kraft paper is untreated on both sides. Preferably, the central kraft paper layer 104 has a grammage of 95 $g/m^2$ to 125 $g/m^2$ and/or a tensile strength MD of greater than 10 kN/m and/or a thickness of 0.140 mm to 0.175 mm.

This central kraft paper layer 104 is bonded directly, and in its entirety, to the underlying inner kraft paper layer 103, in particular by being glued, by wrapping it around the tubular body of the barrier layer 102 and inner kraft paper layer 103.

For gluing, glue, preferably polyvinyl acetate, is preferably applied to the outside of the inner kraft paper layer 103 or the inside of the central kraft paper layer 104 in an amount of 10 to 25 $g/m^2$, in particular 15 to 20 $g/m^2$.

The can shell 101 formed by these three layers shown in FIG. 16 preferably has a thickness D from 378 to 495 µm, in particular 430-460 µm. The thickness difference ΔD is preferably between 196 µm and 290 µm, preferably 220-270 µm. In the area of the folded seam, the can body has a thickness Dmax of preferably 650-730 µm, where Dmax is approximately 150% of the thickness D of the adjacent can shell 101.

Preferably, the can body has a fourth layer, which is formed from the outer paper or kraft paper layer 105. The outer paper or kraft paper layer 105 preferably has a grammage of 80-130 g/m², in particular 100-120 g/m². The outer paper or kraft paper layer 105 preferably has a thickness of 70-120 µm, in particular 90-110 µm.

The outer paper or kraft paper layer 105 is applied in the winding installation over the central kraft paper layer 104 and adhered, preferably with glue, preferably polyvinyl acetate, in an amount of preferably 10 to 25 g/m², in particular 15 to 20 g/m², to the entire surface.

Figure 17:
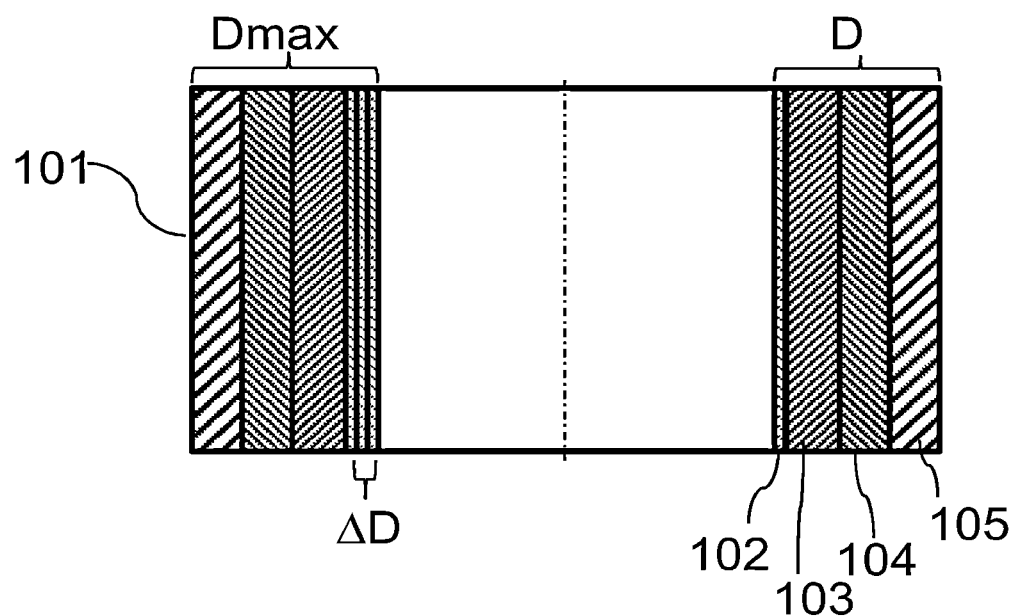
FIG. 17: shows a longitudinal section through an alternative embodiment of the cylindrical can shell according to the invention with a barrier layer and three kraft paper layers.

The can shell 101, consisting of the barrier layer 102, the inner kraft paper layer 103, the central kraft paper layer 104, and the outer paper or kraft paper layer 105 (without the barrier layer 106) is illustrated in FIG. 17. The thickness D of the can shell is approx. 550 µm, wherein in the region of the folded seam the maximum thickness Dmax is 800 µm, which corresponds to about 145% of the thickness D of the adjacent can shell 101. The thickness difference ΔD is approx. 250 µm. The can shell 101, consisting of the barrier layer 102, the inner kraft paper layer 103, the central kraft paper layer 104 and the outer paper or kraft paper layer 105, preferably has a total thickness of 500-650 µm, more preferably 550-620 µm. The can shell 101 consisting of the barrier layer 102, the inner kraft paper layer 103, the central kraft paper layer 104 and the outer paper or kraft paper layer 105 preferably has a tensile strength CD of greater than 300 N/15 mm, in particular greater than 350 N/15 mm, i.e., greater than 20 kN/m in particular greater than 23 kN/m. Preferably, the can shell 101 consisting of the barrier layer 102, the inner kraft paper layer 103, the central kraft paper layer 104 and the outer paper or Kraft paper layer 105 has a grammage of at least 400 g/m², in particular at least 450 g/m².

Preferably, this outer kraft paper layer 105 is provided on the side facing the outside of the can with an outer barrier layer 106, for example a single-layer barrier film, with or without pinholes, preferably polyethylene (PE) with a grammage of 15 g/m² and/or a thickness of 15 microns or coated with a varnish.

Alternatively, the outer layer may consist only of an outer barrier layer 106 in the form of a barrier film, with or without pinholes, preferably PE with 25 g/m². In this case, the inner kraft paper layer 103 and second kraft paper layer 104 may be adjusted in their material thickness so that the total material thickness of the can shell is maintained.

Figure 18:
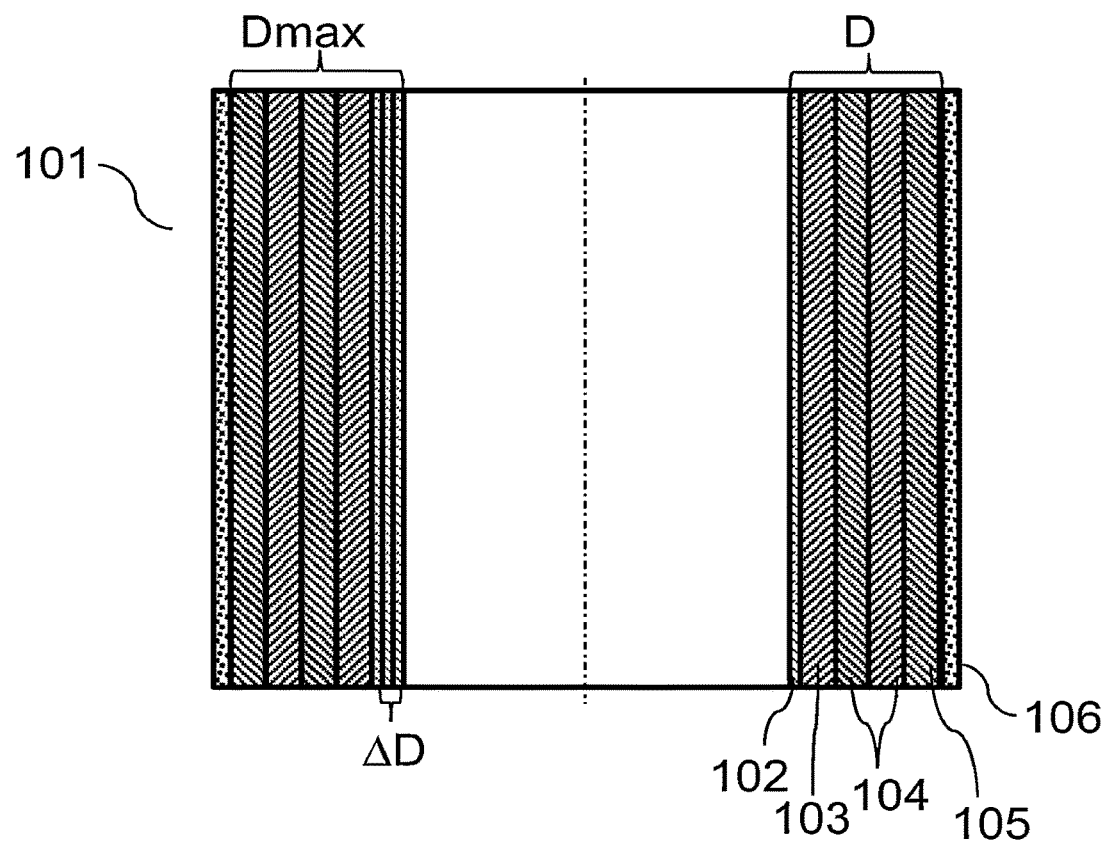
FIG. 18: shows a longitudinal section through an alternative embodiment of the cylindrical can shell according to the invention with a barrier layer and four kraft paper layers.

Depending on the height and diameter of the can, it is envisioned that the number of central kraft paper layers 104 may be greater than one, for example, for a can having a height of 245 mm and a diameter of 175 mm, a number of two central layers are preferred, as illustrated in FIG. 18. With the preferred thicknesses per kraft paper layers 103, 104, 105 of 0.160 µm and thickness of the barrier layer 102 of 127 µm, the total thickness D of 767 µm results, for example.

Depending on the height and diameter of the can, it can be provided that the inner kraft paper layer 103, the central kraft paper layer 104 and the outer kraft paper layer 105 have greater strength, for example in the case of a can with H: 245 mm and D: 175 mm with a thickness of 265 µm each. With a thickness of the barrier layer 102 of 127 µm, for example, a total thickness D of 922 µm results.

Increasing the number of layers is advantageous over increasing the thickness of the layers since with thinner layers a higher process speed and a higher stability of the can body in relation to the overall grammage of the kraft paper used may be achieved.

The tensile strength index MD, as the quotient of the tensile strength MD and grammage of the kraft paper used for the kraft paper layer 107 and the kraft paper layers 103, 104, 105, is preferably in the range of 70-120 Nm/g.

The tensile strength index CD, as the quotient of the tensile strength CD and grammage of the kraft paper used for the kraft paper layer 107 and the kraft paper layers 103, 104, 105, is preferably in the range of 35-70 Nm/g.

The tensile strength index MD of the kraft papers used is preferably greater than 80 Nm/g. The tensile strength index MD is particularly preferably greater than 100 Nm/g.

The tensile strength index CD of the kraft papers used is particularly preferably greater than 40 Nm/g. The tensile strength index CD is particularly preferably greater than 50 Nm/g.

In addition to the kraft paper layer 107, the layer structure preferably comprises at least two further kraft paper layers 103, 104 with the specified tensile strength indices MD and CD. The kraft paper layer 107 or at least one of the further kraft paper layers 103, 104 may also be formed from another cardboard material which has the specified tensile strength indices MD and CD. Kraft paper is distinguished from conventional papers by greater tensile strength indices MD and in particular CD (cross direction).

Preferably, the kraft paper of the kraft paper layer 107 and kraft paper layers 103, 104 is unbleached. The paper or kraft paper of the outer paper or kraft paper layer 105 may be bleached, which may be advantageous for printing with designs on the outside thereof. The outer paper or kraft paper layer 105 may already be printed with a product design before being wound, and this printing may advantageously be present between the paper or kraft paper layer 105 and the outer barrier layer 106. The cutting in the cutting device 26 is then registered with respect to the printing.

Figure 19:
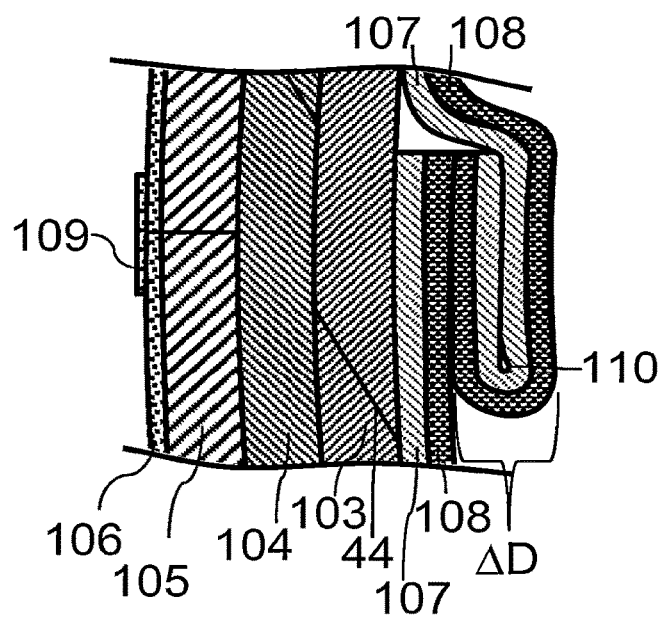
FIG. 19: shows the layer structure of a cylindrical can shell according to the invention in a detailed view of a cross section through the longitudinal folded seam of the barrier layer with sealing strips on the outer seam.
Figure 20:
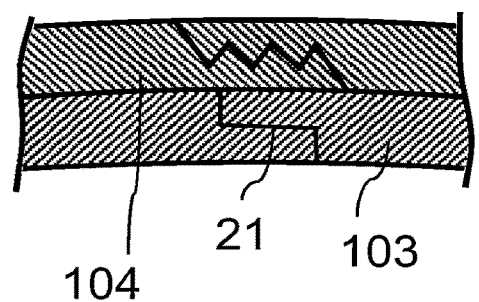
FIG. 20: schematically shows possible overlapping areas of kraft paper layers.

FIG. 19 shows a cross section through a particularly preferred construction of the can shell 101 according to the invention. In this construction, the inner kraft paper layer 103 and the intermediate kraft paper layer 104 have obliquely shaped lateral edges so that the two edges of the layers opposite the respective web material overlap each other but without, or without substantial, increase in the layer thickness of the layer in the overlapping area. As an alternative to the oblique shape, other shapes of the edges are also suitable, such as stepped edges or interlocking edges, as illustrated in FIG. 20. Generally speaking, at least one of the two edges of at least one of the kraft paper layers 103, 104, 105 is preferably provided with a shape which leads to a reduction in the thickness of the overlapping region of the two edges. Particularly preferably, both edges of at least one of the kraft paper layers 103, 104, 105 are provided with a shape such that the thickness of the superimposed edges is equal to the thickness of the layer itself. Particularly preferably, the innermost kraft paper layer 103 is provided with such a structure. Preferably, at least one existing central kraft paper layer 104 is provided with such a structure, particularly preferably all existing central kraft paper layers 104.

As shown in FIG. 19, the edges of the outer kraft paper layer 105 preferably meet at the joint, wherein the gap is sealed in the joint region by applying a strip 109 (also referred to as a stripe) of PE, PET or PP, or a sealing material is applied by means of a spray head after the can body forming. The abutting edges of the outer kraft paper layer 105 are advantageous since the resulting gap is more regular and thus visually appealing and no reduction in the layer thickness of the edge region of the outer kraft paper layer 105 is present, which would be less stable to mechanical effects from the outside.

Less preferably, the edges of the inner kraft paper layer 103 and/or the edges of the intermediate kraft paper layers 104 may meet at the joint, wherein it is assumed that this could adversely affect the stability of the layer structure.

To produce the can shell 101 according to the invention, the barrier layer 102 is first fed as web material in the longitudinal direction of a mandrel of a winding machine, and moved further in the longitudinal direction of the mandrel. The two edges are formed around the mandrel so that these edges meet on the other side of the mandrel and the mandrel is now enclosed by the web material.

To produce the folded seam, the two edges of the web material of the barrier layer 102 are preferably welded to the barrier laminate 108 adjacent to one another. For this purpose, the two edges are bent away from the mandrel, arranged on top of one another and welded. After welding, the two welded-together edges are turned over to one side so that the welded-together edges come to rest with their kraft paper layers 107 on the kraft paper layer 107 of the portion of the barrier layer 102 surrounding the mandrel, wherein at least one of said kraft paper layers 107 may already be provided with glue to firmly bond the two kraft paper layers 107. Preferably, however, the barrier layer 102, i.e. the kraft paper layer 107, is not provided with glue on the outside thereof.

Figure 26:
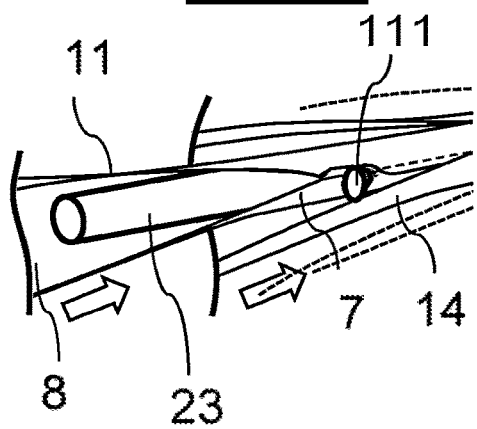
FIG. 26: shows an extension of a winding plant according to the invention with a device for introducing adhesive when folding the folded seam.

Particularly preferably, therefore, the winding machine according to the invention is provided as an improvement of the known prior art with an applicator, for example with a nozzle 111, which applies adhesive (e.g., glue or hotmelt) in a targeted manner to at least one of the two juxtaposed regions of the kraft paper layers 107 in the region of the folded seam. This is shown in FIG. 26. Preferably, adhesive is thereby deliberately introduced into the free space 110, which would or could arise due to the rigidity of the kraft paper when folding the mutually welded edges in the edge region of the kraft paper layer 107 by 180°. In other words, the adhesive is preferably applied to the fold or at least near the fold of the outwardly projecting overlap of the barrier layer 102 so that, when the overlap is applied to the barrier layer 102, the adhesive spreads between the overlap and the underlying cylindrical shaped barrier layer 102.

This advantageously prevents air being trapped in this free space 110, which could adversely affect the stability of the can shell 101. The introduced material, preferably glue 22, supports in the cured state the kraft paper layer 107 in the region of the 180° bend so that pressure arising in the can does not lead to the fibres of the kraft paper layer 107 tearing off at the location of the bend. In addition, the internal pressure of the can would pressurise entrapped air in the layer structure, which pressure of the entrapped air would stress the layer structure from within, or would cause the entrapped air to seek to escape towards the ends closed with covers, which may lead to creeping damage there.

Alternatively, the fold may also be made by first folding an edge of the web of barrier layer 102 back 180° and then gluing the kraft paper layer 107 of the folded-back edge to the kraft paper layer 107 below it. In this case, too, an application device, for example a nozzle, is preferably provided, which specifically introduces adhesive onto at least one of the adjacent areas of the kraft paper layers 107 in the region of the back-fold and in particular also into the free space 110, which arises during the folding of the kraft paper layer 107 by 180° due to the rigidity of the kraft paper. The folding back and gluing preferably takes place immediately in front of the winding machine during feeding of the web material. The material web placed around the mandrel therefore has on one side a normal or single-layer edge and on the other side a double-layer by folding back of the edge on the layer itself, wherein the double edge comprises the barrier laminate 108 on the side facing away from the mandrel. At the winding mandrel, the double edge with the outwardly facing barrier laminate 108 is now first applied coming from one side of the mandrel and subsequently from the other side of the mandrel the single-layer edge region is placed around the mandrel with the barrier laminate 108 facing the mandrel so that its barrier laminate 108 comes to rest on the barrier laminate 108 of the bent edge and is welded to it. The result of this manufacturing variant is likewise a folded seam as shown in FIGS. 14, 15, 19 and 21-23.

In the next step, the inner kraft paper layer 103 is placed around the barrier layer 102, in that it is also preferably fed as web material in the longitudinal direction of the mandrel of the winding machine and moved further in the longitudinal direction of the mandrel. The two edges of the inner kraft paper layer 103 are formed around the barrier layer 102 located on the mandrel so that these edges meet on the other side of the mandrel and the barrier layer 102 located on the mandrel is now enclosed by the web material of the inner kraft paper layer 103. As described, the edges of the inner kraft paper layer 103 preferably overlap one another so that they are glued together. The inner kraft paper layer 103 is provided with glue on the inside, for example by applying it during the feeding of the web material, wherein the glue when fitting or pressing the inner kraft paper layer 103 to the kraft paper layer 107 of the barrier layer 102 is distributed over the entire area between the layers.

In the next steps 0 to preferably max. 3 central kraft paper layers 104 are successively laid around the inner kraft paper layer 103, in which these are also preferably fed as web material in the longitudinal direction of the mandrel of the winding machine and moved in the longitudinal direction of the mandrel. The two edges of each central kraft paper layer 104 are formed around the kraft paper layer 103 already located on the mandrel so that these edges meet on the other side of the mandrel and the kraft paper layer 103 located on the mandrel is now enclosed by the web material. As described, the edges of each central kraft paper layer 104 preferably overlap one another so that they are glued together. Each central kraft paper layer 104 is provided with glue on the inside, for example by applying it during the feeding of the web material, wherein the glue when fitting or pressing the central kraft paper layer 104 to the kraft paper layer 103 already located on the mandrel is distributed over the entire area between the layers.

In the next step, the outer paper or kraft paper layer 105 is formed around the outer kraft paper 103, 104 already wound around the mandrel, in that it is also preferably fed as web material in the longitudinal direction of the mandrel of the winding machine and moved further in the longitudinal direction of the mandrel. The two edges of the outer kraft paper layer 105 are formed around the outer kraft paper layer 103, 104 already located on the mandrel so that these edges meet on the other side of the mandrel and the kraft paper layer 103, 104 already located on the mandrel is now enclosed by the web material. As described, the edges of the outer kraft paper layer 105 preferably do not overlap one another so that they meet at the joint. The outer kraft paper layer 105 is provided with glue on the inside, for example by applying it during the feeding of the web material, wherein the glue when fitting or pressing the outer kraft paper layer 105 to the kraft paper layer 103, 104 wound below is distributed over the entire area between the layers.

As illustrated in FIG. 19, the outer kraft paper layer 105 may preferably already have an outer barrier layer 106, i.e. be supplied as a laminate or web material coated on one side so that it has a liquid-resistant or liquid-repellent outer side. For example, the outer kraft paper layer 105 may be provided with a waterproof or moisture-tight printing.

Figure 21:
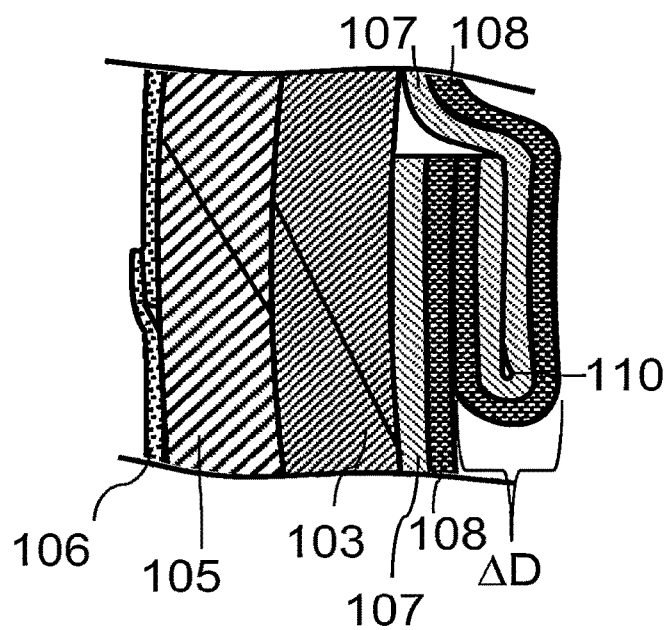
FIG. 21: shows the layer structure of a cylindrical can shell according to the invention in a detailed view of a cross section through the longitudinal folded seam of the barrier layer with an overlap seam of the outer barrier layer.
Figure 22:
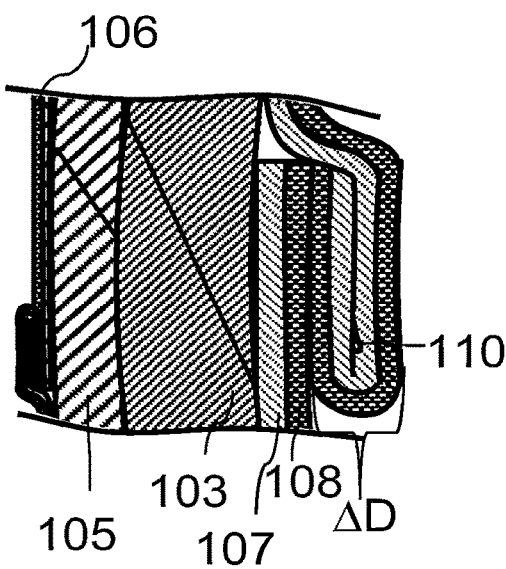
FIG. 22: shows the layer structure of a cylindrical can shell according to the invention in a detailed view of a cross section through the longitudinal folded seam of the barrier layer a folded seam of the outer barrier layer.
Figure 23:
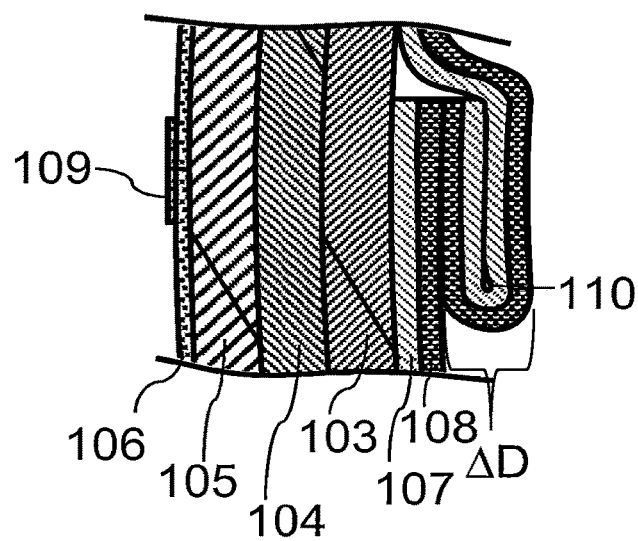
FIG. 23: shows the layer structure of a cylindrical can shell according to the invention in a detailed view of a cross section through the longitudinal folded seam of the barrier layer with sealing strips on the outer seam.

If the outer kraft paper layer 105 does not yet have a liquid-resistant or liquid-repellent outer side during feeding, it can be provided with such in the winding machine or after the winding machine. For example, a liquid-resistant or liquid-repellent film or a laminate may be applied around the outer kraft paper layer 105 within the winding machine. For example, after winding, the shaped hollow cylinder may be sprayed or printed with a liquid-resistant or liquid-repellent substance, in particular a paint. Should a liquid-resistant or liquid-repellent film or a laminate be applied around the outer kraft paper layer 105 with the winding machine, this film or laminate may be welded plastic-side on the plastic side to tightly enclose the outer kraft paper layer 105. In the case of a film, a simple overlap suffices, as illustrated in FIG. 21. In the case of a laminate, for example made of film and thin printing or label paper, a folded seam may also be provided thereon, as illustrated in FIG. 22. As shown in FIG. 23, a barrier layer 106 may also be applied in the form of a printing or label layer, which is tight at least on its outside, over the outer kraft paper layer 105, which printing or label layer is then sealed, for example, with a glued-on strip 109 in the abutting region of its two edges.

If the outer kraft paper layer 105 already has a liquid-resistant or liquid-repellent outer side during feeding, in the next step, the joint region of the outer layer is preferably sealed on the winding machine, for example by applying liquid-resistant or liquid-repellent material as a liquid, or in the form of a strip 109, in particular adhesive tape, as is illustrated in FIG. 19.

The outer seam of the outer paper or kraft paper layer 105 or a further layer arranged above it can thus be designed as a folded seam, as a simple overlap or as a joint (butt joint seam). The butt joint seam may be sealed by hotmelt, a stripe or a tape or a sealing liquid, wherein these means are preferably applied at the winding machine after winding the outermost layer and before cutting the individual hollow cylinder. The stripe or the tape may be self-adhesive, or be present as a plastic strip, in particular PE strip, which is fixed by ultrasonic welding.

Figure 25:
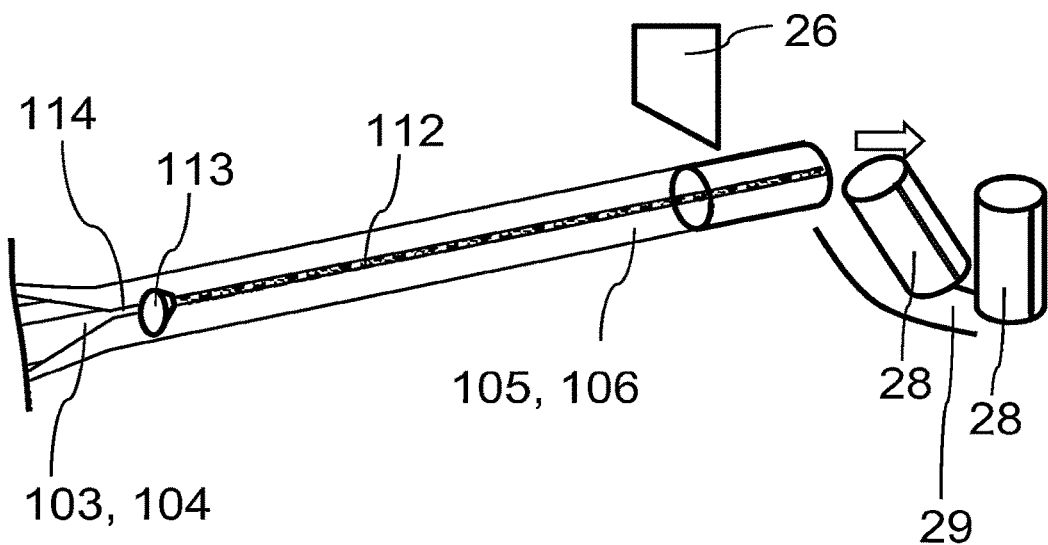
FIG. 25: shows an extension of a winding plant according to the invention with a device for sealing the outer longitudinal seam.

Preferably, as illustrated in FIG. 25, hotmelt 112 is applied in the winding machine with a nozzle 113 to the paper tube located on the mandrel and moved past the nozzle 113. Preferably, the nozzle is directed perpendicular to the gap of a butt joint seam 114 running in the longitudinal direction of the outermost layer of the paper tube applied in the winding machine. The nozzle 113 may be cylindrical or rectangular in cross-section and have a straight or even opening surface. Preferably, however, the nozzle opening surface is concave, as seen in the circumferential direction of the paper tube, that is adapted to the cylindrical shape of the tube, wherein the opening surface of the nozzle preferably has a uniform distance from the tube.

Figure 27:
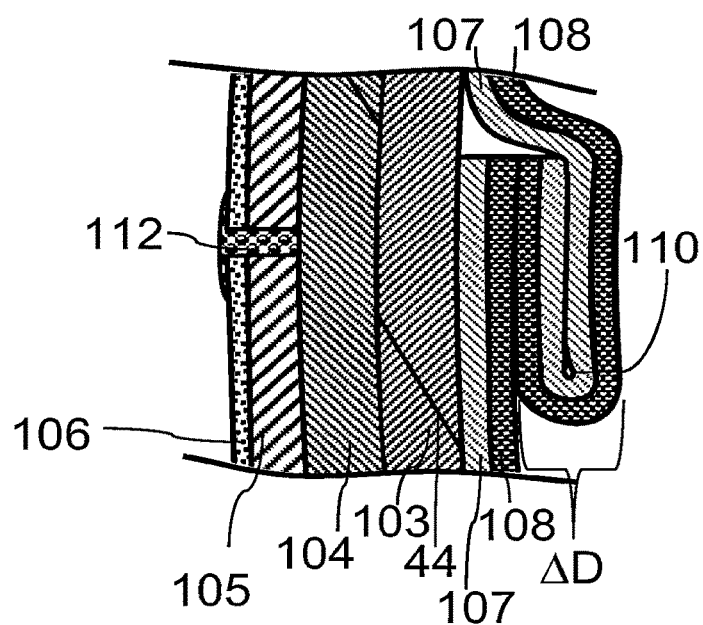
FIG. 27: shows the layer structure of a cylindrical can shell according to the invention with hotmelt sealing of the butt joint seam of the outer barrier layer.

The hotmelt 112 is preferably applied directly in the winding machine after winding the outermost layer, wherein the outermost layer is or has a tight outer barrier layer 106 already. The hotmelt 112 is applied to seal the absorbent cut edges of the outermost layer and/or to seal the underlying kraft paper layer 103 or 104 exposed along the butt joint seam 114. Preferably, the outer layer is formed from an absorbent material, in particular paper or kraft paper, which is provided on its outside with a moisture-resistant material, for example laminated with a moisture-resistant film or coated with a moisture-resistant substance. The gap of the butt joint seam 114 is preferably in the range of 0.5-4 mm inclusive. Hotmelt 112 is preferably applied in the form of a strip projecting over the gap of the butt joint seam 114, wherein the width of the strip of hotmelt 112 is preferably at least 1 mm, in particular at least 2 mm wider than the width of the gap of the butt joint seam 114. For example, the width of the gap of the butt joint seam 114 is 3 mm and the width of the hotmelt strip is 6 mm. The hotmelt 112 is applied in heated state, for example at 160° C.-190° C. and hardened by cooling until the individual cylinders are cut from the mandrel 23 of the winding machine. This can preferably be supported by a cooling device, for example in the form of a blower. FIG. 27 shows an exemplary can shell 101 according to the invention with hotmelt sealing of the butt joint seam of the outermost layer. By the folded seam or Anaconda sealing of the barrier layer 102, the directly glued kraft paper layers 103, 104, the outer barrier layer 106 and the sealed butt joint seam of the outer layer results a particularly preferred can body since the sealing of the butt joint seam with an adhesive results in a very flat or homogeneous outer circumference of the can. The film formed on the outer barrier layer 106 by the adhesive or hotmelt 112 is, for example, only 0.05 to 0.1 mm thick. Instead of the outer kraft paper layer 105, comprising the barrier layer 106, it is also possible to use a different paper or cardboard material, preferably one made from or containing recycled paper or fibre material.

Figure 24:
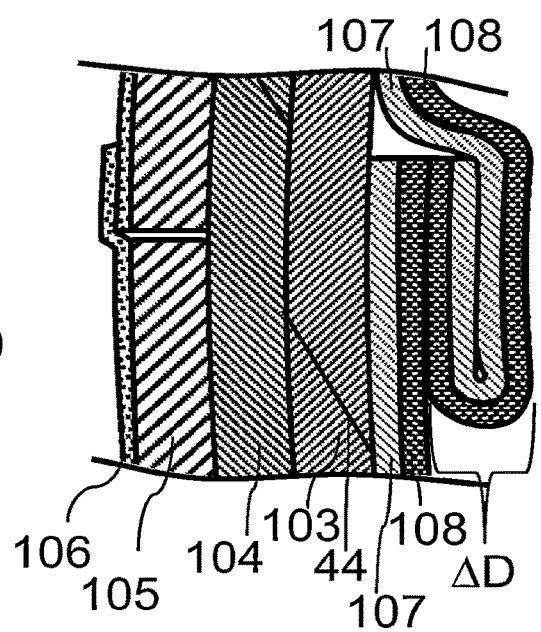
FIG. 24: shows the layer structure of a cylindrical can shell according to the invention in a detailed view of a cross section through the longitudinal folded seam of the barrier layer with overlap sealing of the joint seam of the outer barrier layer.

FIG. 24 shows a further outer layer sealing variant according to the invention, in which the outer kraft paper layer 105 is provided with an outer barrier layer 106 in the form of a film, wherein the kraft paper layer 105 and the film are present as a laminate and thus fed together as a material web to the winding device. The film layer is designed to be longer in the cross direction of the material web than the kraft paper layer 105 so that the edge of the film layer protruding on one side comes to rest on the other non-protruding edge of the film layer, as can be seen in FIG. 24. In this case, the protruding edge of the film layer may be melted or welded onto the film layer which does not overlap the kraft paper, or an adhesive may be applied to the underside of the overlapping region, in particular an activatable, in particular heat-activatable, adhesive, for bonding the film layer to itself.

After the layers have been wound and joined into a tubular body, individual hollow cylinders are cut from the mandrel using known cutting machines.

The individual hollow cylinders are subsequently bent up at their two ends in the edge region.

The bending is preferably carried out in a length range of 5 mm, wherein the outer edge is bent outwards by 2.5 mm From the outer edge, the bent-up region preferably merges along a circular path with a radius of preferably 3-4 mm, in particular 3.3-3.5 mm, into the not-bent-up shell region.

The cut or already bent edges are preferably provided with a sealing liquid so that their absorption capacity is reduced by moisture. This is preferably done by applying this sealing liquid during the bending process. Alternatively, the sealing of the cut edges can be carried out by applying a tape or a shrink tube.

The bent and finally sealed hollow cylinders are subsequently transferred to a can closing machine in which first one end, preferably the lower end, of the hollow cylinder is closed with a first closing element, for example first a bottom element 4. The bottom element 4 is preferably an aluminium bottom element of a conventional aluminium can, which has at least approximately the same volume or the same diameter as the present can.

Thereafter, the medium, in particular a carbonated beverage, is filled in the bottom closed hollow cylinder, preferably in an amount of 0.25 litres.

The filled hollow cylinder is subsequently closed at the top with a second closure element 25, for example with a cover element 5. The cover is preferably an aluminium cover of a conventional aluminium can, which has at least approximately the same volume or the same diameter as the present can.

The closing and filling is preferably carried out on a clocked plant with a throughput of 80,000 cans/hour.

Preferably, 40,000 can bodies/hour are produced on the winding machine, which means a speed of approximately 1.5 m/s of the finished pipe in the direction of the winding mandrel. The desired process output of 80,000 cans/h can be achieved by mirroring the machine, wherein the flanged can bodies from both machine units are brought together in front of the can bottom sealer.

Preferably, the present can shells 2, which originate from the slower winding system, may be closed together with conventional aluminium can shells at the same faster closure and filling plant, and more preferably with the same bottom elements and the same covers and without retooling or time interruption. This means that the speed of the winding system is no longer critical to the process and the filling plant can be operated independently of this with full process performance.

The composite cans according to the invention and conventional aluminium cans can be filled and closed in batches or alternately at the same plant so that the lower production speed of a single winding plant is compensated by the production of conventional aluminium cans. For example, 40,000 cans/hour and 40,000 aluminium cans/hour can then be produced at the plant so that advantageously two product lines, i.e., environmentally friendly composite cans and proven aluminium cans are produced simultaneously and continuously on a plant.

The need for composite shell cans according to the invention can be exactly met and the remaining capacity for standard cans used, which is particularly advantageous for product introduction since the sale of composite cans according to the invention would not initially lead to full utilisation of a conventional filling plant. The simultaneous or sequential use according to the invention of the filling plant for cans according to the invention and conventional aluminium cans thus additionally reduces a further inhibition threshold for product conversion since aluminium cans can continue to be produced and can only gradually be replaced by composite cans to an increasing proportion.

In FIGS. 10 to 12, a filling and sealing plant according to the invention is shown, with which both pipe sections 28 and can shells 101 made of composite material, which consist mainly of paper or cardboard material and can shells 117 made of aluminium or tinplate are optionally filled and sealed. The can filling and sealing plant according to the invention comprises a first feeding device 115, with which the can shells 101 made of composite material are provided, and has a second feeding device 116, with which conventional can shells 117 are provided. As shown, the feeder 115, 116 may be linear feeders such as conveyors or the like. The feed device 115, 116 may also be robots or other handling devices which lift the can shells 101, 117 onto the transport device 119. In the case of a robot or other handling device which alternately places composite can shells 101 and conventional can shells 117 on the conveyor 119, the feeders 115, 116 may also be implemented as one device that accomplishes both tasks.

In the case of feeding with linear conveyors these are preferably controlled by at least one setting element 118, which controls from which feeding device 115, 116 can shells 101, 117 reach the transport device 119 of the system, or in which order and/or ratio can shells 101, 117 arrive on the transport device 119.

Preferably, the feeding device 115 for the can shells 101 made of composite material is connected directly to the production apparatus of these can shells 101, wherein a buffer zone can advantageously be arranged upstream of the setting element 118. Less preferably, the can shells 101 may be delivered in batches from a manufacturing apparatus to the feeder 115 and stored there. The can shells 101 are particularly preferably can shells 101 according to the invention according to the alternative embodiments of FIGS. 13-24 and in particular 27.

From the feeder 116, prefabricated conventional can shells 117 made of aluminium or tinplate are supplied from warehouse stock since the production of these at the point of filling is virtually impossible.

The can shells 101, 117 transferred from the feed device 115 and 116 to the transport device 119 in a preferably selectable ratio are preferably transported by this transport device 119 through all stations of the system.

The first station is a first closure device 30, with which first closure elements, for example bottom elements 4, are attached to the can shells 101, 117 open on both sides. The attachment of the closure elements is performed with a crimping device 32, respectively crimping a closure element with a can shell 101, 117 in a pressure-tight manner.

The can shells 101, 117 closed on one end are transported by the transport device 119 onwards to the second station, the filling device, wherein the can shells 101, 117 are turned on their way there so that the closed end of the cans lies below. The turning device is not shown.

The filling device is preferably a carousel filling station 33, in which a plurality of cans 101, 117 closed on one side are filled in an overlapping manner, particularly preferably with a carbonated beverage, in particular a strongly carbonated beverage, such as cola or other carbonated soft drinks.

From the filling device, the transport device 119 transports the filled can shells 101, 117 to the third station, which is a further closure device 34.

With the second closure device 34, second closure elements, for example covers 5, are attached to the filled can shells 101, 117 which are open on one side. The attachment of the closure elements is performed with a crimping device 35, respectively crimping a closure element with a can shell 101, 117 in a pressure-tight manner.

The first closure element may be the bottom element 4 and the second closure element may be the cover 5, or vice versa.

The second closure device 34 is preferably followed by a switch 127 with which the cans with can shell 101 mainly made of cardboard or paper material and the cans with can shells 117 made of aluminium or tinplate are divided on separate transport devices 128, 129. Alternatively, the cans may also be removed from the transport device 119 by robots or other handling devices. Thereafter, the different cans are each stored sorted or packaged for further transport.

Alternatively, the packaging can also be carried out together, for example, in a mixture of the two types of cans to be placed in a transport container. Advantageously, such may be packed in a known plastic wrap or cardboard container for cans, for example, three conventional aluminium cans and one composite shell cans to convince sceptical consumers of the new packaging. Due to the selectable mixing ratio of the different cans, this may be ideally adapted to common packaging sizes, for example as just described 3:1 for four-packs or 5:1 for six-packs, or 23:1, 20:4 or 18:6 for pallets.

The mixing ratio with which the can shells 101, 117 are successively processed in the plant can also be carried out in larger blocks of different can shells 101, 117, for example 24 composite can shells 101 alternately with 240 conventional alumina shells, or 40,000 composite can shells 101 alternately with 40,000 alumina shells. Wherein a smaller block size (successive number of can shells of one type) of the composite can shells 101 is preferred since these can then be filled according to the speed of the winding device without great storage of the can shells 101 between the winding device and the filling plant. Preferably, the mixing ratio of composite can shells 101 to alumina shells is 1:x, where x is greater than or equal to 1 and wherein the block size of the composite can shells 101 is preferably less than 10, particularly preferably 1. It is particularly advantageous in a continuous feeding and filling of the composite can shells 101 that thereby a winding device connected to the filling device can work continuously, as longer stoppages of the winding device are problematic since already applied glue would then cure before attaching the layers of the hollow cylinder or would clog applicators or nozzles.

Preferably, only one type of closure element is used in the closure devices 30, 34 for all types of can shells 101, 117 of the same size.

Less preferably, respective own closure elements in the required mixing ratio are provided for can shells 101 made of cardboard or paper composite material and can shells 117 made of aluminium or tinplate. The advantage of this is that closure elements for the can shells 101 of cardboard or paper composite material can be used, which have been specially adapted for this material.

Instead of providing the closure elements with one feeder unit as shown, less preferably two could be present, one feeder unit providing closure elements for the can shells 101 made of cardboard or paper composite material and the other closure elements for the can shells 117 made of aluminium or tinplate. The same applies to the crimping devices 32, 35 should the different closure elements or can shells 101, 117 require or be advantageous for different crimping devices.

The different crimping devices 32, 35 may preferably be located successively on the transport device, with each crimping device 32, 35 closing only those can shells 101, 117 for which it is designed.

Less preferably, the merging or splitting of the different can shells 101 can also take place only immediately before or immediately after the filling device 33. This means that can shells 101 made of cardboard or paper composite material, which are already closed at the bottom, are fed from the feed device 115 to the transport device 119 immediately before the filling device 33 and/or the switch element 127 can discharge the filled can shells immediately after the filling device 33 from the transport device 119 for separate closure in its own closure device.

Example 1

With the particularly preferred layer structure of FIG. 27, beverage cans having a height of 134 mm and an outside diameter of 52.4 mm and a filling volume of 250 ml of a carbonated beverage are produced. As a paper or kraft paper layer 105, a paper layer 105 of less tear-resistant, wood-free paper, specifically Lumiflex™ 110 gsm Stora Enso AG is used, which is provided with a PE coating on the later outside of the can. The beverage cans are sealed at the top and bottom with standard bottoms and covers of aluminium cans with standard closing equipment.

The layers used and the resulting layer structure are specified in the following table.

| | Grammage | Thickness | Tensile strength MD lso 1s24-2 | Tensile strength CD lso 1s24-2 |
|---|---|---|---|---|
| Barrier laminate 108 | 45 g/m$^2$ | 45 μm | Not determined | Not determined |
| Kraft paper layer 107 | 60 g/m$^2$ | 82 μm | 7.0 kN/m | 3.5 kN/m |
| Kraft paper layer 103 | 125 g/m$^2$ | 160 μm | >10 kN/m | >5 kN/m |
| Kraft paper layer 104 | 125 g/m$^2$ | 160 μm | >10 kN/m | >5 kN/m |
| Paper layer 105 | 110 g/m$^2$ | 101 μm | 7.3 kN/m | 0.7 kN/m |
| Outer barrier layer 106 (PE) | 15 g/m$^2$ | 15 μm | Not determined | Not determined |
| Total layer structure | approx. 500 g/m$^2$ | approx. 600 μm | not determined | >23 kN/m |

The tensile strength MD (Machine Direction) indicates the tensile strength of the kraft paper in the longitudinal direction of the can shell 101, tensile strength CD (Cross Direction) indicates the tensile strength of the kraft paper in the circumferential direction of the can shell 101. It can be seen that the conventional paper of the paper layer 105 used, in particular in the cross direction (CD), has a significantly lower tensile strength.

The grammage of the entire layer structure of the can shell 101 is increased compared to the sum of the individual layers due to the glue application of 18 g/m$^2$ per layer of glue. The glue application amounts to a total of 54 g/m$^2$ due to the three full-surface layers of glue.

As the barrier laminate 108, a laminate having the structure of PE plastic film of 25 μm thick, aluminium foil of 7 μm thickness, 3 μm thick Surlyn bonding agent, and PE plastic film of 15 μm thickness is used.

For the can shell 101, a tensile strength measurement in the circumferential direction of the can shell is carried out by cutting it into 15 mm wide strips. With this dimension, an average tensile strength of 374.3 N/15 mm is measured, which corresponds to a tensile strength of 25 kN/m.

The cans thus prepared are suitable for the storage and transport of the carbonated beverage.

The particularly preferred layer structure of the container according to the invention therefore has an inner barrier layer 102 made of a barrier laminate 107 and a kraft paper layer 108 with a folded seam extending in the longitudinal direction of the can, above it two wound kraft paper layers 103, 104, each with an overlapping seam running in the longitudinal direction of the can kraft paper layers 103, 104 in the seam region at least at one edge has a reduced thickness, above kraft paper layers 103, 104 follows a wound layer of paper or cardboard material, which has, on the outside, an outer barrier layer 106 extending in the longitudinal direction of the can and a gap forming a butt joint seam, which is sealed with hotmelt, wherein the kraft paper layers 103, 104 with their kraft paper surfaces are adhered, in particular glued, directly to each other and to the underlying and overlying layers.

The advantages of the cans according to the invention are the recyclability and the good ecological assessment. Since the can of the materials used is similar to a plastic-coated cardboard packaging, the aluminium parts, the paper layers and the plastic films can be separated from each other and separated and sorted for recycling with known dissolution methods analogous to this. In particular, the high proportion of renewable shares, in particular in the form of paper, makes the can advantageous over cans made of aluminium and/or plastic. The ecological assessment of this can is better than that of conventional aluminium cans.

The ifeu—Institut für Energie—and Umweltforschung Heidelberg GmbH has determined a $CO_2$ equivalent of 225 kg/1000 l for the present can with 330 ml, while the $CO_2$ equivalent of an aluminium can with 330 ml has been determined to be 350 kg/1000 l.

Figure 28:
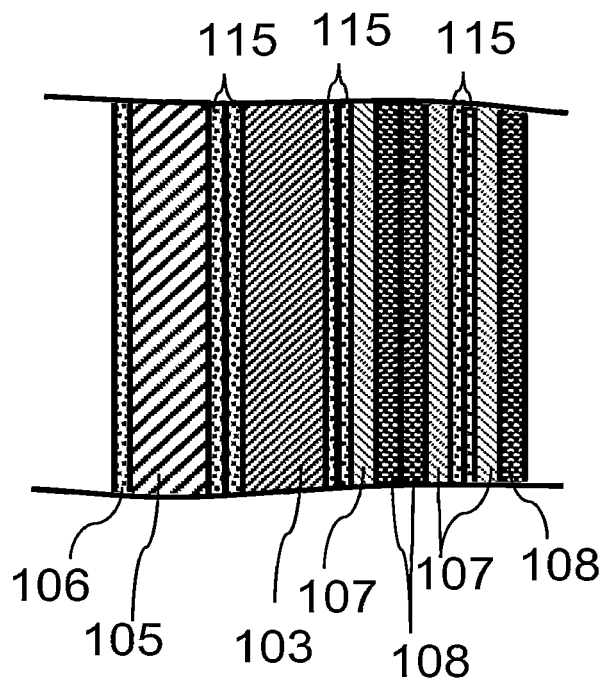
FIG. 28: shows a not claimed layer structure of a cylindrical can shell in longitudinal section through the folded seam.

FIG. 28 shows a variant of a can shell 101 in longitudinal section through a folded seam of the barrier layer for use in a can 1 containing a liquid and/or a gaseous medium which may have positive pressure or may develop such during transport or storage, wherein the cylindrical can shell (101) of the can consists mainly of paper or cardboard material and comprises at least two wound layers and is closed at the bottom with a bottom element (4) and at the top with a cover element (5), wherein the can (1) withstands an internal pressure of at least 5 bar, wherein the innermost layer of the can shell 101 consists of a straight-wound barrier layer having a folded seam extending in the longitudinal direction of the can 1, wherein the barrier layer is a laminate made of an of an inner diffusion-tight film or an inner diffusion-tight barrier element 108, a central paper or preferably kraft paper layer 107 and an outer plastic layer 115, wherein at least one further wound layer made of paper or cardboard material with an inner plastic layer 115 is present around the barrier layer of the can shell 101, wherein the adjoining plastic layers 115 of the barrier layer 102 and the further wound layer made of paper or cardboard material are welded directly to each other.

In additional variants, various features of the dependent claims could be adapted accordingly by replacing adhesive or glue with bonding the layers with the two adjacent welded plastic layers 115.

The further wound layer of paper or cardboard material with an inner plastic layer 115 may also have an outer plastic layer 115.

In addition, one to preferably a maximum of two further layers of paper or cardboard material, each with an inner plastic layer 115 and/or outer plastic layer 115, may be present, wherein the adjacent plastic layer 115 of the layers are welded together.

The further wound layers made of paper or cardboard material with their plastic layers 115 may in turn have a longitudinal seam, preferably with a reduced thickness in the overlapping region with itself. The outermost layer may again have a butt joint seam, with appropriate sealing of the gap.

The paper or cardboard material of one or more or all layers may preferably be kraft paper or paper or cardboard material with comparable tensile indices MD (Machine Direction) and CD (Cross Direction).

The invention claimed is:

1. A method for producing a can, comprising:
making, in a first step, can shells with a continuous winding machine in which at least a first layer, a second layer, and a third layer are applied one after another as individual layers over a winding mandrel and are continuously connected to each other while each layer is advanced in a longitudinal direction on the winding mandrel, the first layer being the innermost layer, the making step comprising:
straight-winding the first layer over the winding mandrel such that two edges of the first layer overlap and form a folded seam extending in the longitudinal direction,
wherein the first layer comprises a barrier layer comprising a laminate made of one of:
an inner diffusion-tight film, and
an inner diffusion-tight barrier laminate and an outer kraft paper layer,
straight-winding the second layer which comprises paper or cardboard material around the barrier layer, wherein the adjoining cardboard or paper surfaces of the barrier layer and the second layer made of paper or cardboard material are adhered to each other,
straight-winding at least the third layer which comprises paper or cardboard material around the second layer, and
cutting a resulting tube into individual cylindrical hollow bodies open on both sides,
bending, in a second step, the two open ends of the cylindrical hollow body outwards so that the ends have a circular cross-section with a larger diameter than the remaining cylindrical hollow body,
closing, in a third step, the lower end of the cylindrical hollow body by a crimping device with a bottom element,
filling, in a fourth step, the closed hollow body with the medium using a filling device, and
further closing, in a fifth step, the hollow body, which is closed at the bottom, by a crimping device at the top with a cover element,
wherein the fourth and the fifth steps are carried out at a filling plant which is suitable for filling and closing known aluminium cans.

2. The method according to claim 1, wherein in said first step on the winding machine, an adhesive is applied with a nozzle selectively in the region of the folded seam of the straight wound barrier layer where the two kraft paper layers of the folded seam of the outer kraft paper layer come to rest against each other.

3. The method according to claim 1, wherein, in said first step, on the winding machine, an adhesive is selectively applied with a nozzle in the region of a longitudinal seam of the outermost layer applied in the winding machine so that the longitudinal seam is sealed by the adhesive before the resulting tube is cut into individual cylindrical hollow bodies open on both sides.

4. The method according to claim 1, wherein, after the first or second step and in any case prior to the third step, cut edges of the hollow body open on both sides are sealed in order to decrease the ability of the paper or cardboard layers to absorb liquids and/or gases at the cut edges.

5. The method according to claim 1, wherein the winding system and a machine for processing the two open ends of the cylindrical hollow body are provided at the place of filling so that the production of the cans takes place without long transport routes and without large stockpiling of can shells.

6. The method according to claim 5, wherein the can shells are fed from the machine for processing the two open ends of the cylindrical hollow body without intermediate storage of a transport device of a filling system.

7. The method according to claim 1, wherein the filling plant is used offset or alternating in time for filling cans and conventional aluminium cans.

8. The method according to claim 7, wherein the filling system comprises a transport device for transporting the can shells through the plant, wherein can shells made of composite material and can shells made of aluminium are transported from the transport device at the same time, for alternately filling the different cans in a certain ratio.

9. The method according to claim 1, wherein the second layer comprises a first overlapping region in which a first part of the second layer overlaps with a second part of the second layer.

10. The method according to claim 9, wherein the overlapping region of the second layer adjoins the first layer and is offset relative to the folded seam of the first layer.

11. The method according to claim 9, wherein the third layer comprises a second overlapping region in which a first part of the third layer overlaps with a second part of the third layer.

12. The method according to claim 11, wherein the first overlapping region and the second overlapping region are located at different peripheral regions.

13. A method for producing a can, comprising:
straight-winding a first layer over a winding mandrel, the first layer being an innermost layer and comprising a barrier layer, the barrier layer comprising an inner diffusion-tight layer and an outer kraft paper layer, two edges of the first layer overlapping and forming a folded seam extending in a longitudinal direction;
straight-winding a second layer around the first layer;
adhering a first adjoining surface of the first layer and a second adjoining surface of the second layer;
straight-winding a third layer around the second layer; and
cutting a resulting tube into a plurality of cylindrical hollow bodies having two open ends.

14. The method of claim 13, wherein:
the second layer comprises one of paper and cardboard material; and
the third layer comprises one of paper and cardboard material.

15. The method of claim 13, further comprising:
bending the two open ends of one of the cylindrical hollow bodies outwards so that the two open ends have a first cross-section larger than a second cross-section of a central portion of the one of the cylindrical hollow bodies; and
crimping a bottom element onto one of the two open ends to form a bottom.

* * * * *